United States Patent [19]

Ohashi et al.

[11] Patent Number: 4,647,421
[45] Date of Patent: Mar. 3, 1987

[54] OPERATION CONTROL METHOD FOR NUCLEAR REACTOR

[75] Inventors: Masahisa Ohashi; Hiroyuki Masuda, both of Hitachi, Japan

[73] Assignee: Hitachi, Ltd., Tokyo, Japan

[21] Appl. No.: 597,032

[22] Filed: Apr. 5, 1984

[30] Foreign Application Priority Data

Apr. 6, 1983 [JP] Japan .................................. 58-59301

[51] Int. Cl.$^4$ .......................... G21C 7/36; G21C 7/06
[52] U.S. Cl. ..................................... 376/216; 376/219
[58] Field of Search ............... 376/215, 216, 217, 218, 376/219

[56] References Cited

U.S. PATENT DOCUMENTS 4,279,698 7/1981 Doi ...................................... 376/210
4,299,657 11/1981 Abenhaim ........................... 376/217

FOREIGN PATENT DOCUMENTS 57-141594 9/1982 Japan .

Primary Examiner—Donald P. Walsh
Attorney, Agent, or Firm—Antonelli, Terry & Wands

[57] ABSTRACT

An operation control method for a nuclear reactor performing a load follow-up operation in accordance with a load variation program, wherein a core reactivity which changes with time in a first cycle of operation is predicted based on the load variation program and data for analyzing dynamic characteristics of the reactor, and a change in a liquid poison concentration in the first cycle of operation is obtained based on the predicted reactivity, and reactor power is controlled in the first cycle of operation by adjusting the liquid poison concentration in accordance with the obtained change. When the liquid poison concentration is adjusted and control rods are manipulated, a reactivity introduced by these operations in the first cycle of operation is obtained, and an adjustment to be made to the liquid poison concentration in the second cycle of operation which is the next cycle of operation following the first cycle of operation is obtained from the reactivity introduced in the first cycle of operation. When the change in reactivity in the second cycle of operation becomes equal to that in the first cycle of operation, and reactor power is controlled in the second cycle of operation by performing the obtained adjustment of the liquid poison concentration.

13 Claims, 20 Drawing Figures

OPERATION CONTROL METHOD FOR NUCLEAR REACTOR

BACKGROUND OF THE INVENTION

This invention relates to operation control methods for nuclear reactors, and more particularly it is concerned with an operation control method for a nuclear reactor that can have application in a nuclear reactor performing a daily load follow-up operation in which power control is effected by using control rods and liquid poisons.

A pressure tube type nuclear reactor comprises a multiplicity of pressure tubes having fuel assemblies therein which are mounted in a calandria tank to extend through a moderator contained therein. A coolant flows through the pressure tubes. Power control of this type pressure tube type nuclear reactor is effected by inserting and withdrawing control rods in the moderator between the pressure tubes in the calandria tank, and adjusting the concentration of a liquid poison incorporated in the moderator in the calandria tank.

In recent years, there has been a tendency to adopt a method of operation of a nuclear reactor which aims not only at producing a fixed reactor power for a base load but also at developing a reactor power which may vary depending on a fluctuation in load, by performing a load follow-up operation. The pressure tube type nuclear reactor of the type described hereinabove is not an exception, and research has been conducted into the possibilities of incorporating the load follow-up operation in this type of nuclear reactor. For example, a proposal has been made in Japanese Patent Laid-Open No. 141594/82 to incorporate the load follow-up operation in a pressure tube type nuclear reactor.

The document referred to hereinabove shows in FIG. 5 thereof a load follow-up operation control system for a pressure tube type nuclear reactor which is designed to effect control of operation of a nuclear reactor in a manner to cope with demands for electrical power which vary from daytime to nighttime during a day by increasing power in the daytime and reducing it in the nighttime everyday. In a nuclear reactor using control rods and liquid poison concentration adjustments as control means, such as a pressure tube type nuclear reactor and pressurised-water reactor, control is effected to keep the reactor power in the range of allowable powers between an upper limit line and a lower limit line set above and below, respectively, a power fall line or a predetermined power fall rate (or a power rise line or a predetermined power rise rate) in accordance with a fall (or a rise) of the reactor power.

Load follow-up operation control of a pressure tube type nuclear reactor will be described. In this control process, a high reactor power achieved in the daytime is reduced to a low power level in the nighttime by increasing the concentration of a liquid poison in the calandria tank. Insertion and withdrawal of the control rod are performed only when the reactor power tends to exceed the upper limit line or lower limit line of the range of allowable powers because they cause great damage to the fuel assemblies by bringing about sudden changes in reactor power. Operation of the control rods has a much higher rate of change in reactor power than adjustments of the concentration of the liquid poison, and has the risk of damaging the fuel assemblies in a high nuclear power range. Thus, one should refrain from operating the control rods as much as possible in the high power range.

The load follow-up operation control of the pressure tube type nuclear reactor shown in FIG. 5 of the document referred to hereinabove aims at the reduction of the number of times of operation of the control rods during a load follow-up operation of the reactor. The control is effected by obtaining predicted values of changes with time of the reactivity from changes in the reactor power by using values of the reactor power set beforehand and data for analyzing the dynamic characteristics of the nuclear reactor, splitting the time for effecting power control into time units in accordance with the changing rate of reactivity obtained from the predicted values, and determining optimum values of the quantity of liquid poison to be injected or removed for each time unit, to thereby control the concentration of the liquid poison in the calandria tank to an optimum level at all times. Although this control process has achieved a success in reducing the number of times of operation of the control rods, the control rods are still operated for about 300 times to keep the reactor power to the vicinity of 50% when a load follow-up operation of the reactor is performed while maintaining the reactor power at a 50% level.

SUMMARY OF THE INVENTION

An object of this invention is to provide a method of operation control for a nuclear reactor enabling load follow-up operation control performed repeatedly to be simplified in process.

Another object is to provide a method of operation control for a nuclear reactor capable of reducing the number of times of operation of control means for effecting coarse adjustments of the power of the nuclear reactor.

One outstanding characteristic of the invention is that a reactivity introduced by operating control means in a first cycle of a load variation program is obtained, a manipulated variable of second control means for effecting fine adjustments of reactor power in a second cycle of the load variation program which follows the first cycle is obtained based on the reactivity introduced in the first cycle, and control of reactor power is effected by operating the second control means in the second cycle based on the manipulated variable obtained in the first cycle.

The outstanding characteristic described hereinabove simplifies the process of effecting load follow-up operation control because power control is effected by operating the second control means in the next following cycle based on the reactivity introduced in the preceding cycle, thereby facilitating load follow-up operation control.

Another outstanding characteristic is that a reactivity introduced by operating first control means in a first cycle of a load variation program is obtained, a manipulated variable of second control means for effecting fine adjustments of reactor power in a second cycle of the load variation program which follows the first cycle is obtained based on the reactivity introduced in the first cycle, and control of reactor power is effected by operating the second control means in the second cycle based on the manipulated variable obtained in the first cycle, when a change in the reactivity occurring in the second cycle becomes equal to a change in the reactivity occurring in the first cycle.

The outstanding characteristic described hereinabove enables the number of times of operation of the first control means for effecting coarse adjustments of reactor power to be reduced much more than the first mentioned outstanding characteristic.

It has been ascertained that, when load follow-up operation of a pressure tube type nuclear reactor is performed, if the load variation program has the same pattern for each and every day of the operation or if the operation is performed in accordance with the same load variation cycle every day, then changes in the reactor core reactivity have substantially the same pattern after the second day of operation. This phenomenon will be described. FIG. 1 shows changes in the reactivity in the reactor core of a pressure tube type nuclear reactor which occur when load follow-up operation is performed by varying the load every day. In this case, the load follow-up operation is performed in accordance with a load variation program 37A having an operation pattern (load variation cycle) in which an electrical power is reduced from 100% to 50% in one hour as indicated by a characteristic 1 (solid line) and kept at a 50% level for eight hours, followed by a rise from 50% to a 100% level in one hour after lapse of the eight hours and holding the electric power at the 100% level for fourteen hours. This operation pattern is repeated every day. Assume that the pressure tube type nuclear reactor has been operated to obtain 100% of electrical power until the load follow-up operation in conformity with the load follow-up operation program 37A is initiated. Then, if the electrical power changes as indicated by the characteristic 1, a thermal power of the nuclear reactor changes from 55% to 100% as indicated by a characteristic 2 (broken line) and the concentration of xenon produced in the reactor core by nuclear fission changes as represented by a characteristic 3 (one-dot-and-dash line). If the electrical power shows the changes represented by the characteristic 1, then the reactor core reactivity changes as indicated by a characteristic 4 (two-dot-and-dash line) under the influences of the changes in the xenon concentration and power coefficient. The reactor core reactivity indicated by the characteristic 4 is such that, except for the first day on which the mode of operation of the nuclear reactor is switched, changes occurring in the reactor core reactivity follow substantially the same pattern every day.

This phenomenon occurs also when the pattern of load follow-up operation is switched from one with a range between a high electrical power of 100% and a low electrical power of 50% to one with a range between a high electrical power of 100% and a low electrical power of 70%. Stated differently, when the load follow-up operation is performed in accordance with the latter pattern, changes occurring in the reactor core reactivity follow substantially the same pattern after the second day following the first day of introduction of a change in pattern.

The invention is based on the discovery that when load follow-up operation is performed repeatedly in accordance with the same pattern, changes occurring in the reactor core reactivity are substantially equal to each other after the same pattern of operation is repeatedly performed several times.

DESCRIPTION OF THE PREFERRED EMBODIMENTS

Figure 2:
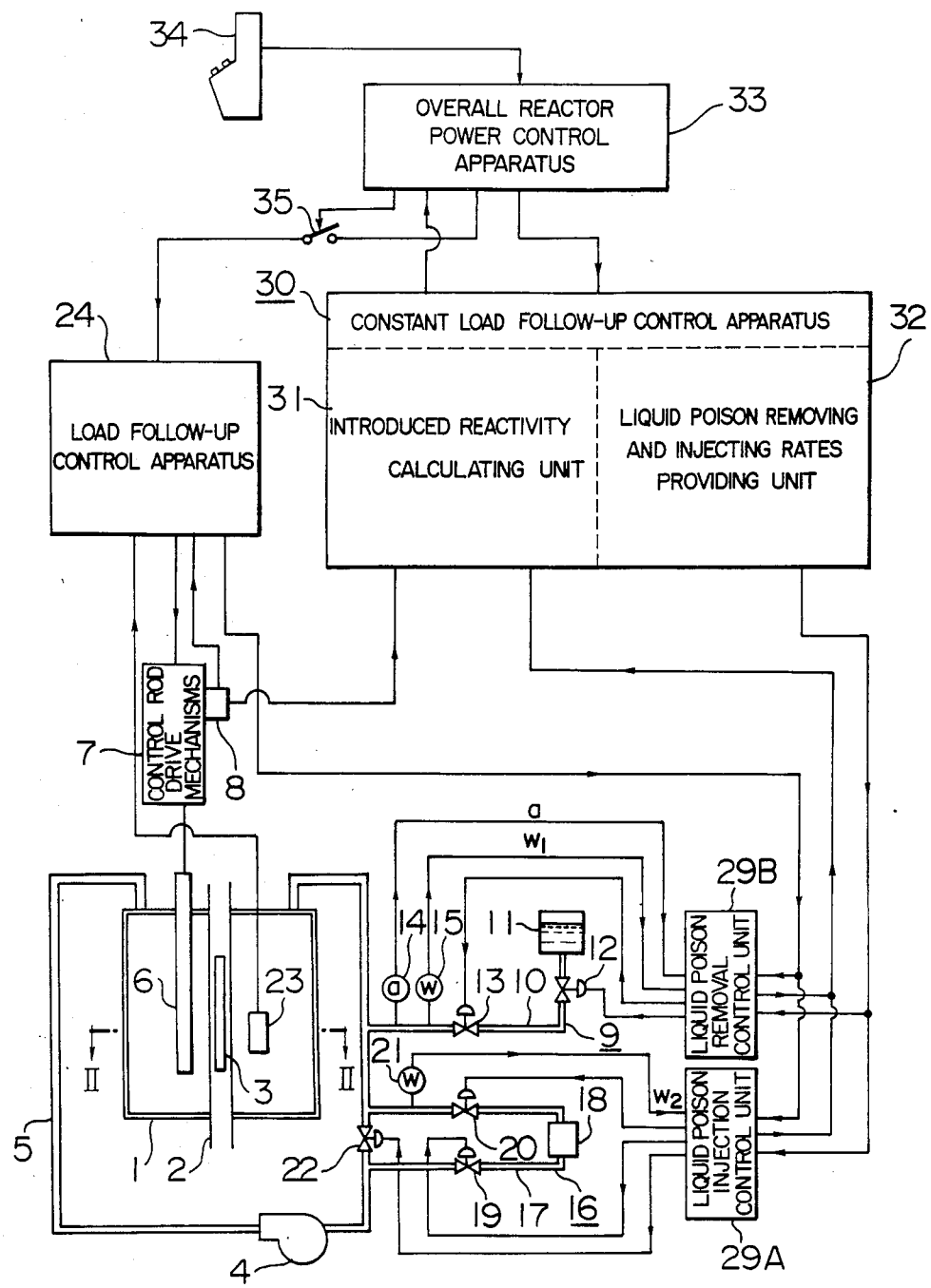
FIG. 2 is a systematic view of a load follow-up operation control system suitable for carrying into practice the operation control method according to the invention as incorporated in a pressure tube type nuclear reactor.
Figure 3:
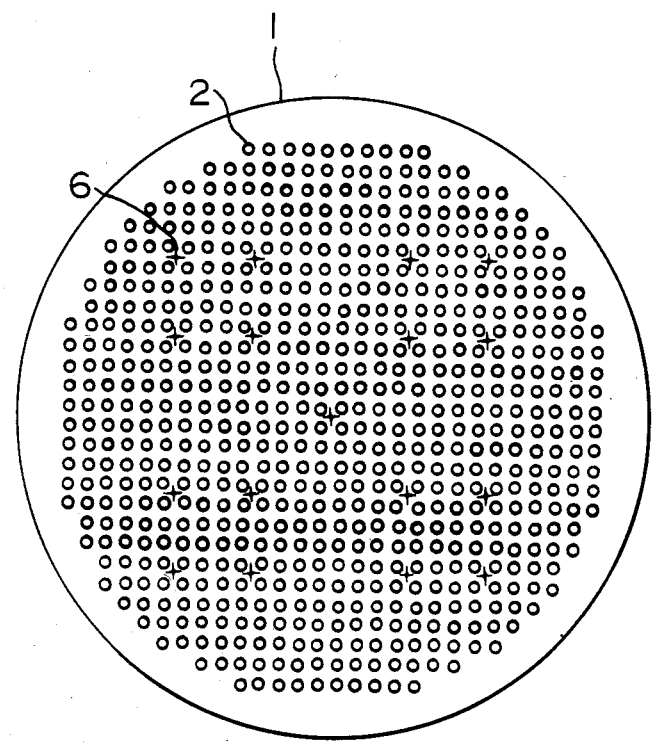
FIG. 3 is a sectional view taken along the line III—III in FIG. 2.

A preferred embodiment of the method of controlling a load follow-up operation of a nuclear reactor in conformity with the invention will now be described by referring to FIG. 2 which shows a load follow-up operation control system suitable for carrying the operation control method according to the invention into practice in a pressure tube type nuclear reactor. As shown, the pressure tube type nuclear reactor comprises a calandria tank 1 containing heavy water functioning as a moderator, and pressure tubes 2 mounted in the calandria tank 1 in a manner to extend therethrough and each having a fuel assembly 3 therein. As shown in FIG. 3, the pressure tubes 2 in the calandria tank 1 are arranged in a horizontal cross section in such a manner that light water serving as a coolant (hereinafter cooling water) is supplied to the interior of each pressure tube 2 from its lower portion and heated by the fuel assembly 3 in each pressure tube 2 into steam. The cooling water containing the steam is supplied to a steam drum, not shown, from an upper portion of each pressure tube 2. In the steam drum, the steam is separated from the cooling water and fed into a turbine, not shown. The cooling water is led again to the lower portion of each pressure tube 2 together with feedwater supplied to the steam drum. In some pressure tube type nuclear reactors, heavy water may be used as a coolant. In this case, the heavy water discharged from the pressure tubes 2 is subjected to heat exchange with light water in a steam generator before being returned to the pressure tubes 2. The light water is converted to steam in the steam generator which is fed to a turbine. The heavy water in the calandria tank 1 which serves as a moderator is circulated through a heavy water circulating line 5 to and from calandria tank 1 by a circulation pump 4.

Control of the power of the pressure tube type nuclear reactor is effected by manipulating power controlling control rods (stainless steel rods) 6 inserted and withdrawn in the calandria tank 1 between the pressure tubes 2 or fuel assemblies 3, and adjusting the concentration of a liquid poison contained in the heavy water filled in the calandria tank 1. The control rods 6 are linked to control rod drive mechanisms 7 which move them into and out of a reactor core constituted by a multiplicity of fuel assemblies 3. In addition to the power controlling control rods 6, a multiplicity of control rods, not shown, for shutting down the nuclear reactor are provided. The shutdown control rods are withdrawn from the reactor core during normal operation of the reactor but inserted therein when the reactor is shut down. Adjustments of the concentration of the liquid poison are effected by manipulating a liquid poison injecting device 9 and a liquid poison removing device 16 mounted on the heavy water circulating line 5. The liquid poison injecting device 9 comprises a line 10 connected to the heavy water circulating line 5, a liquid poison tank connected to the line 10 and having a liquid poison filled therein, and a stop valve 12 and a flowrate control valve 13 mounted in the line 10. A liquid poison concentration meter 14 and a flow meter 15 are mounted in the line 10. The liquid poison removing device 16 comprises a line 17 connected at both ends to the heavy water circulating line 5, a liquid poison removing tower 18 mounted on the line 17 and having an ion exchange resin charged therein, and stop valves 19 and 20 mounted in the line 17. A flow meter 21 is mounted in the line 17, and a flowrate control valve 22 is mounted in the heavy water circulating line 5 and brought to full open position when the liquid poison removing device 16 is inoperative or the stop valves 19 and 20 are closed. When the liquid poison removing device 16 is in operation or when the stop valves 19 and 20 are open, the degree of opening of the flowrate control valve 22 is reduced to thereby control the flow rate of the heavy water supplied through the heavy water circulating line 5 to the liquid poison removing tower 18.

Control of the operation of the control rods 6, liquid poison injecting device 9 and liquid poison removing device 16 is effected based on outputs of neutron detectors 23 located in the heavy water within the calandria tank 1 between the pressure tubes 2.

The load follow-up operation control system for the pressure tube type nuclear reactor of the aforesaid construction comprises a load follow-up control apparatus 24, a liquid poison removal control unit 29A, a liquid poison injection control unit 29B, a constant load follow-up control apparatus 30, an overall reactor power control apparatus 33 and a control board 34. All the control apparatus except the control board 34 are constituted by an electronic computer. The overall reactor power control apparatus 33 coordinates the operations of the load follow-up control apparatus 24 and constant load follow-up control apparatus 30.

Control of the reactivity of a relatively high magnitude that is performed over a relatively prolonged period of time is advantageously effected by adjusting the concentration of the liquid poison in the heavy water; control of the reactivity that is performed over a relatively short period of time is advantageously effected by manipulating the control rods 6. However, operation of the control rods 6 in the range of high reactor powers is preferably avoided to reduce the risk that damage might be caused to the fuel. Adjustments of the concentration of a liquid poison constitute control means of slow action suitable for effecting fine adjustments of the reactor power, and operation of the control rods 6 which achieves results instantly can be said to constitute control means which is suitable to effect corase adjustments of the reactor power because it causes a greater change to occur in the reactor power than the adjustments of the concentration of the liquid poison. In the embodiment of the invention shown and described herein, load follow-up operation of the nuclear reactor is performed by adjusting the concentration of the liquid poison for controlling the reactivity of the reactor.

Figure 4:
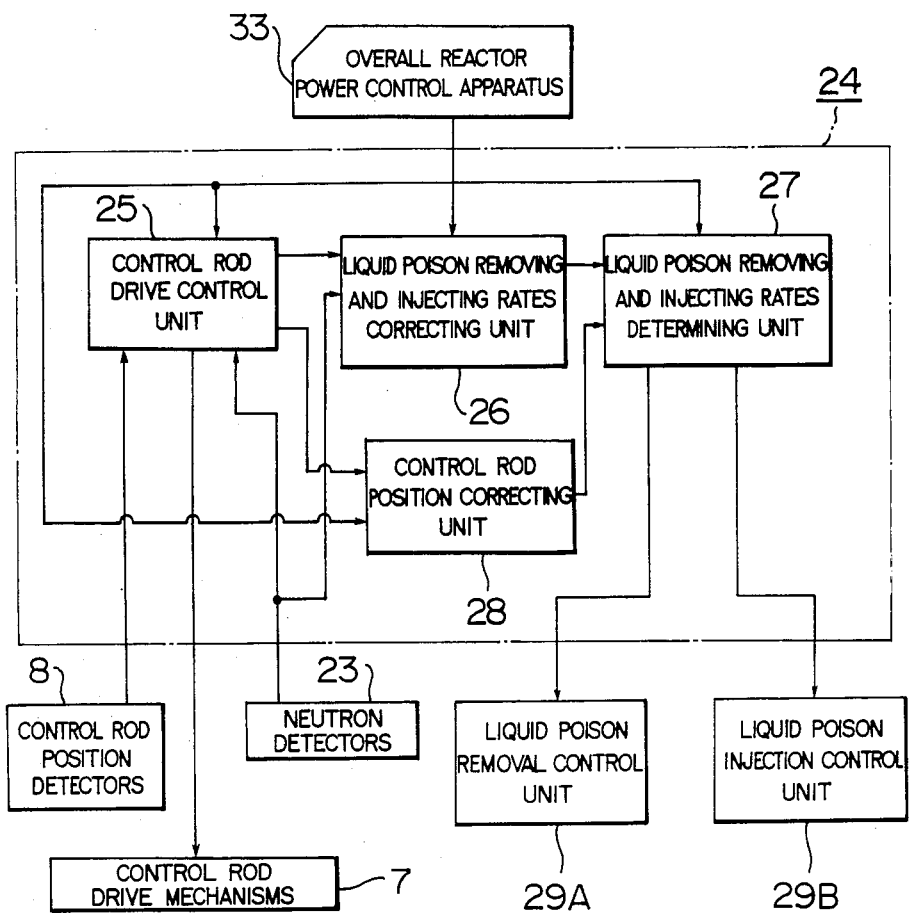
FIG. 4 is a detailed systematic view of the load follow-up operation control system shown in FIG. 2.

The load follow-up control apparatus 24 comprises, as shown in FIG. 4, a control rod drive control unit 25, a liquid poison removing and injecting rates correcting unit 26, a liquid poison removing and injecting rates determining unit 27 and a control rod position correcting unit 28. The constant load follow-up control apparatus 30 comprises, as shown in FIG. 2, an introduced reactivity calculating unit 31, and a liquid poison removing and injecting rates providing unit 32.

Figure 1:
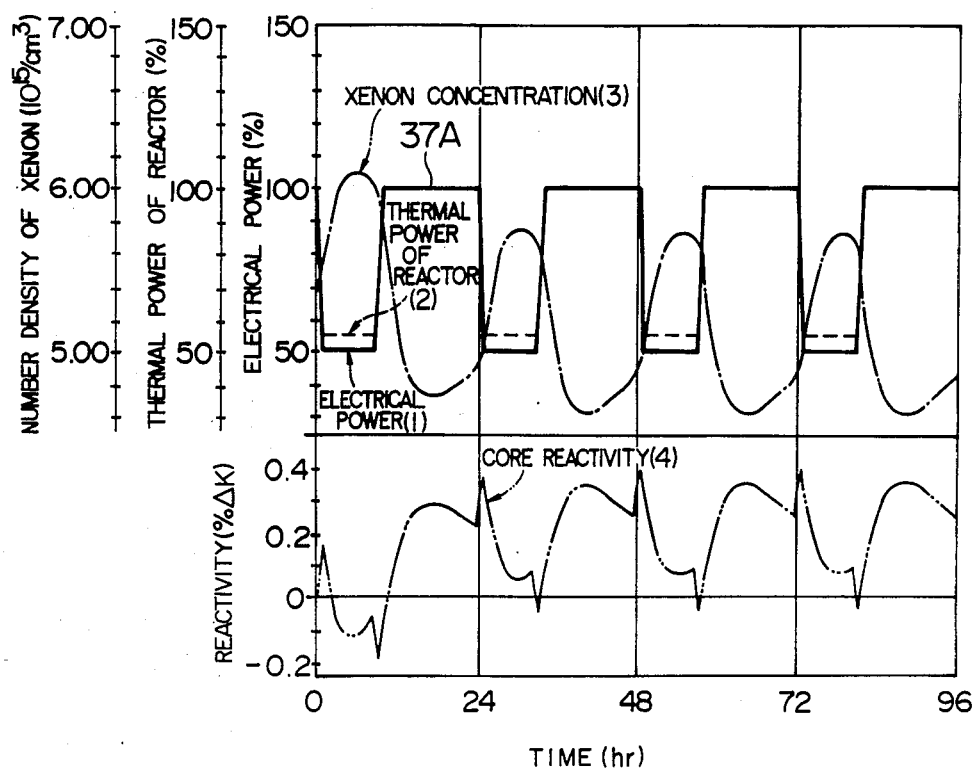
FIG. 1 is a view in explanation of changes occurring in various characteristics in a pressure tube type nuclear reactor when load follow-up operation is performed.
Figure 5:
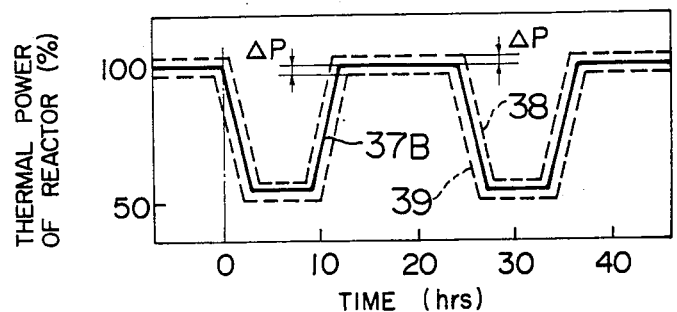
FIG. 5 is a view in explanation of the load variation program.

The embodiment of the load follow-up operation control method in conformity with the invention for performing a load variation program 37A of the characteristics (electrical power) shown in FIG. 1 by using the load follow-up operation control system of the construction described hereinabove will be described hereinafter in detail. FIG. 5 shows a load variation program 37B which shows in terms of changes in the thermal power of the nuclear reactor the load variation program 37A which is shown in terms of changes in the electrical power as shown in FIG. 1. Stated differently, the load variation programs 37A and 37B are similar to each other. The load variation program 37B shows an operation pattern in which the thermal power of the nuclear reactor (hereinafter reactor power) is reduced from a 100% level to a 55% level in one hour and kept at the 55% level for eight hours, and then it is raised from the 55% level to the 100% level in one hour and kept at the 100% for fourteen hours. This operation pattern is repeated every day until a command is given from the operation board 34 to terminate the operation. It is because the turbine efficiency drops when the reactor power falls that the electrical power drops to a 50% level when the reactor power falls to a 55% level. Broken lines 38 and 39 in FIG. 5 represent an upper limit value and a lower limit value respectively of the load variation program 37B. When reactor power control is performed, pressure tube type nuclear reactor is liable to be influenced by changes in the concentration of xenon, resulting in fluctuation in the reactor power. The upper limit value 38 and lower limit value 39 are provided to inhibit this fluctuation in the reactor power to facilitate power control of the nuclear reactor. The upper limit value 38 and lower limit value 39 of the load variation program 37B have differential powers ΔP which constitute a range of allowable powers.

The load variation program 37A is inputted from the control board 34 to the overall reactor power control apparatus 33 in the form of a memory, not shown, to be stored therein. The range of allowable powers ΔP is stored in the memory or overall reactor power control apparatus 33 which compares the operation programs of the nuclear reactor and closes a switch 35 when an operation program distinct from the operation program being performed is introduced. The overall reactor power control apparatus 33 converts, based on the load variation program 37A, an electrical power $P_o(t)$ corresponding to a time t to a reactor power $P_h(t)$ which is transmitted to the load follow-up control apparatus 24 via the switch 35. Then, the overall reactor power control apparatus 33 switches from the load variation program 37A (FIG. 1) to the load variation program 37B (FIG. 5). The time t is measured by a timer mechanism of the overall reactor power control apparatus 33. The range of allowable powers ΔP and time t are transmitted from the overall reactor power control apparatus 33 to the load follow-up control apparatus 24.

The function of the load follow-up control apparatus 24 to which these signals are transmitted will be described.

Figure 6:
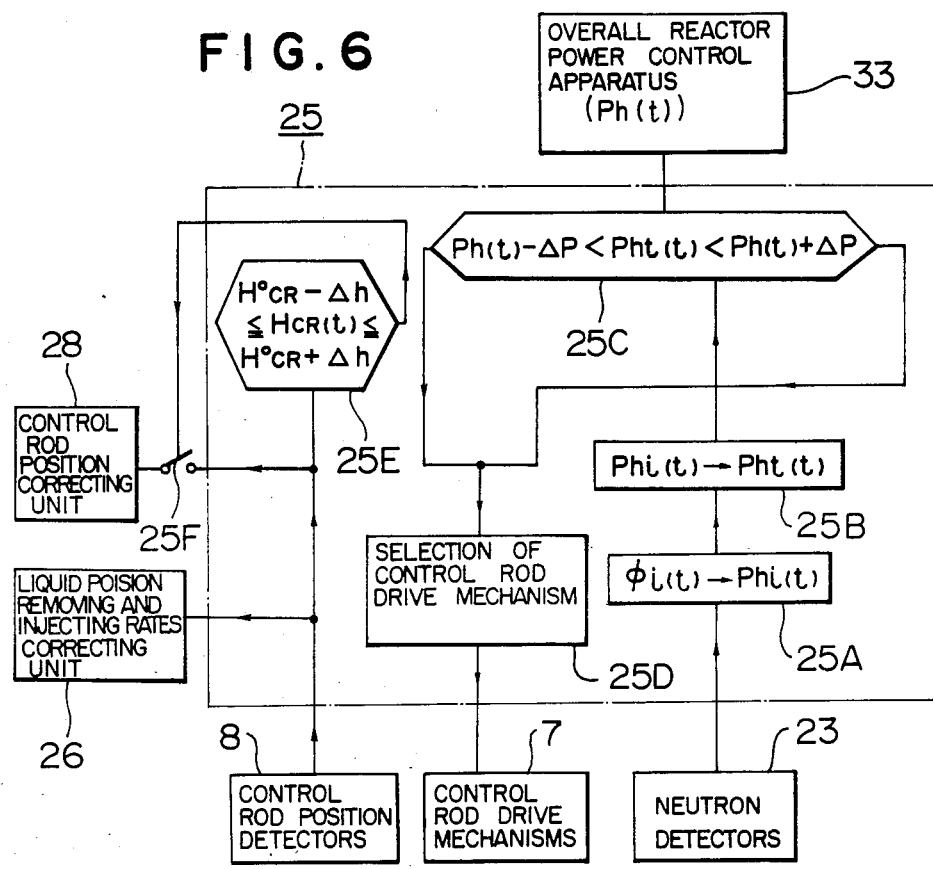
FIG. 6 is a systematic view of the control rod drive control unit shown in FIG. 4.

First, operation of the control rod drive control unit 25 of the load follow-up control apparatus 24 will be described by referring to FIG. 6 in which an output signal $\phi i(t)$ of each neutron detector 23 is inputted to the control rod drive control unit 25. A block 25A of the control rod drive control unit 25 obtains a reactor power $P_{hi}(t)$ of a control zone i of the reactor core based on the output signal $\phi i(t)$ of each control zone i. The output signal $P_{hi}(t)$ of the block 25A is inputted to a block 25B. By obtaining the total of reactor powers $P_{hi}(t)$ of the control zones i, a reactor power $P_{ht}(t)$ of the nuclear reactor can be obtained. The reactor power $P_{ht}(t)$ is inputted to a block 25C and comparison is performed to determine whether or not the conditions of equation (1) are satisfied:

$$P_h(t) - \Delta P < P_{ht}(t) < P_h(t) + \Delta P \qquad (1)$$

When the conditions of equation (1) are satisfied, the control rod drive mechanism 7 remains inoperative and the control rods 6 are not manipulated. When the conditions of equation (1) are not satisfied, the following operations are performed. When $P_{ht}(t)$ is smaller than $[P_h(t) + \Delta P]$, the block 25C produces a control rod withdrawing signal; when $P_{ht}(t)$ is larger than $[P_{ht}(t) + \Delta P]$, the block 25C produces a control rod inserting signal. When these control rod manipulating signals are produced, one of the control rod drive mechanisms 7 corresponding to the produced signal is selected by a block 25D, and an output signal of the block 25D is inputted to the selected control rod drive mechanism 7, so that the control rods associated with the selected drive mechanism 7 are withdrawn from (or inserted into) the reactor core until the conditions of equation (1) are satisfied. A control rod position detector 8 of the control rod drive mechanism 7 produces as its output a position signal $H_{CR}(t)$ which is transmitted to a block 25E. The position signal $H_{CR}(t)$ refers to the position of the forward end of each control rod 6. It is determined in the block 25E whether or not $H_{CR}(t)$ satisfies the conditions of equation (2):

$$H_{CR}^0 - \Delta h < H_{CR}(t) < H_{CR}^0 + \Delta h \qquad (2)$$

$H_{CR}^0$ refers to the initial position and the range of allowable movements of the control rods 6 while $(H_{CR}^0 - \Delta h)$ and $(H_{CR}^0 + \Delta h)$ refer to the allowable lower limit position and allowable upper limit position respectively of the control rods 6. When the position signal $H_{CR}(t)$ does not satisfy the conditions of equation (2), the block 25E produces a signal for closing a switch 25F. When the conditions of equation (2) are satisfied by the position signal $H_{CR}(t)$, the switch 25F remains open. As the switch 25F is closed, the position signal $H_{CR}(t)$ that does not satisfy the conditions of equation (2) is transmitted to the liquid poison removing and injecting rates correcting device 26. The position signal $H_{CR}(t)$ produced as an output of the control rod position detector 8 is also transmitted to the liquid poison removing and injecting rates correcting unit 26.

Figure 7:
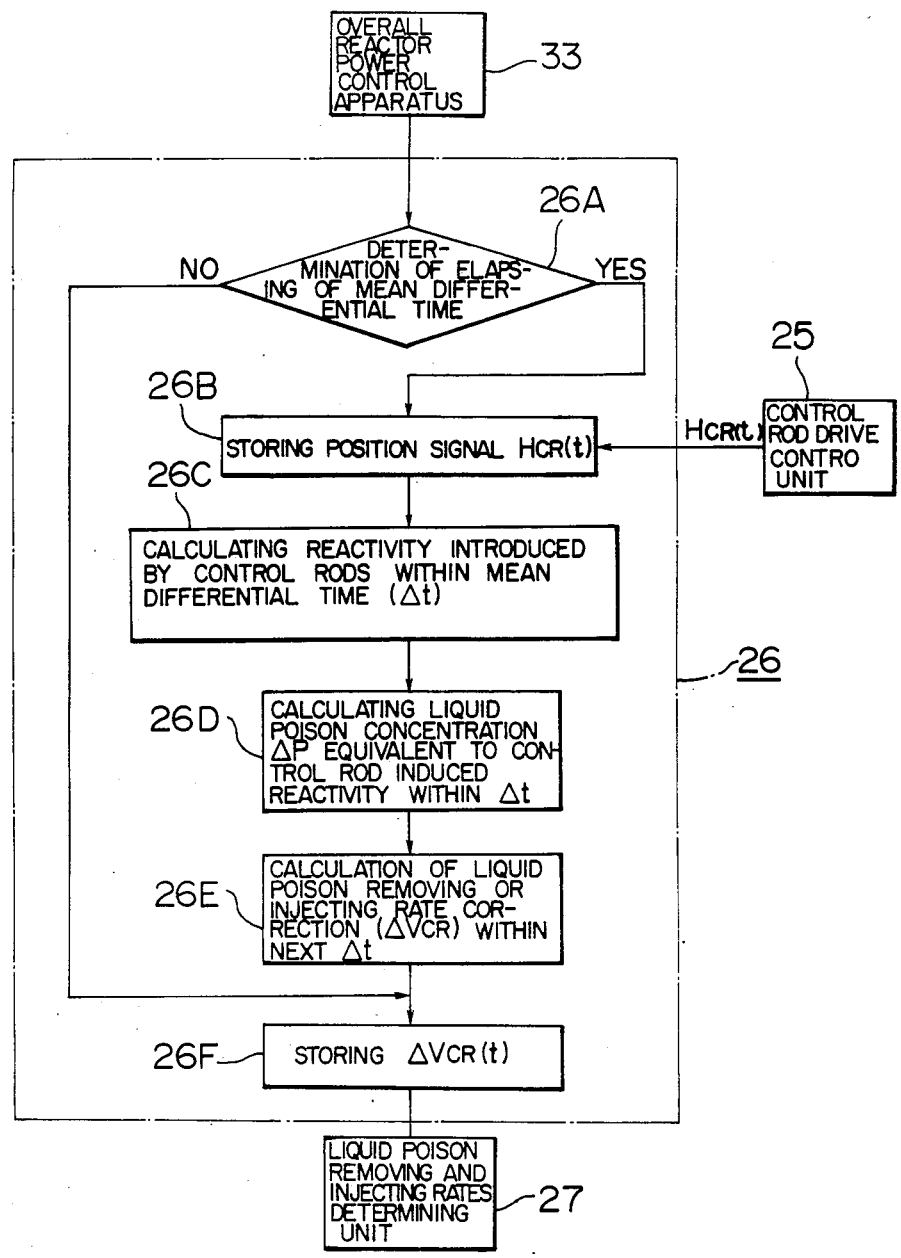
FIG. 7 is a flow chart showing the function of the liquid poison removing and injecting rates modifying device shown in FIG. 4.

The function of the liquid poison removing and injecting rates correcting unit 26 will be described by referring to FIG. 7. The load variation program 37B is inputted from the overall reactor power control apparatus 33 to the liquid poison removing and injecting rates correcting unit 26 which obtains a liquid poison removing or injecting rate corresponding to an introduced reactivity (the difference between a predicted value of controlled reactivity and an actual value of controlled reactivity after introduction of a load variation) for a mean differential time which is much shorter than a control time unit subsequently to be described which is caused by manipulation of the control rods 6, and corrects the liquid poison removing or injecting rate for the next following mean differential time based on the obtained rate. The mean differential time is stored in the liquid poison removing and injecting rates correcting unit 26. In step 26A, it is determined whether or not the mean differential time Δt has elapsed. When the mean differential time Δt has elapsed, the position signal $H_{CR}(t)$ for the control rods 6 inputted from the control rod drive control unit 25 is stored (step 26B). A position signal $H_{CR}(t)$ produced at a point in time at which a new mean differential time Δt has elapsed a position signal $H_{CR}(t)$ stored before the time Δt has started are referred to as $H_1$ and $H_0$ respectively. An introduced reactivity attributed to manipulation of the control rods 6 for the mean differential time Δt is obtained by the following equation (step 26C):

$$\Delta KC = (H_1 - H_0)\alpha \qquad (3)$$

where α is a reactivity corresponding to the movement of a unit length of the control rod 6.

Then, the introduced reactivity attributed to the control rods 6 is converted to a liquid poison concentration ΔP for obtaining an equivalent reactivity by the following equation (step 26D):

$$\Delta P = \Delta KC/\beta \qquad (4)$$

where β is a reactivity per unit concentration of the liquid poison. A correction value $\Delta V_{CR}$ to be incorporated in the liquid poison removing or injecting rate in the next following mean differential time Δt is obtained by the following equation (step 26E):

$$\Delta V_{CR} = \Delta P/\Delta t \tag{5}$$

The new correction value $\Delta V_{CR}$ obtained in step 26E is stored in step 26F in place of the correction value $\Delta V_{CR}$ stored before lapse of the mean differential time Δt. The correction value $\Delta V_{CR}$ is outputted from the liquid poison removing and injecting rates determining unit 27 after lapse of the next following mean differential time Δt prior to initiation of manipulation of the control rods 6.

Figure 8:
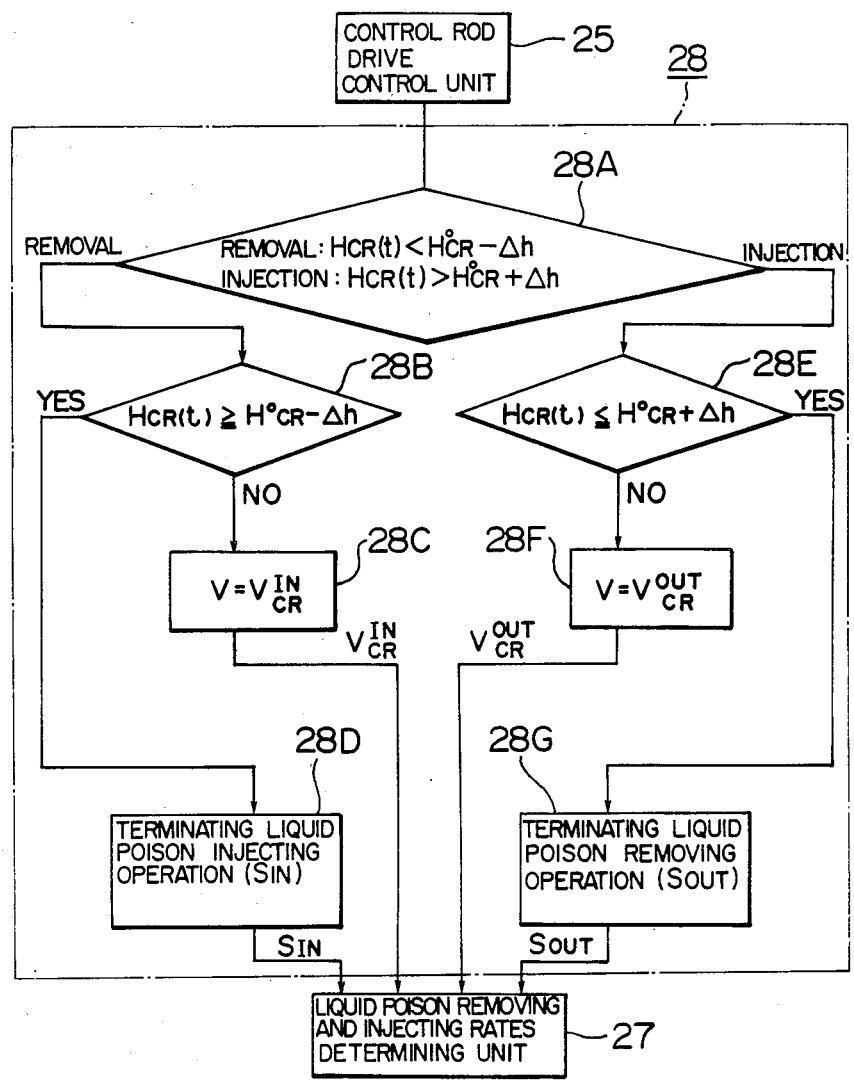
FIG. 8 is a flow chart showing the function of the control rod position correcting device shown in FIG. 4.

The control rod position correcting unit 28 is intended to bring the position of the control rods 6 within a predetermined range. The function of the unit 28 will be described in detail by referring to FIG. 8. When the conditions of equation (2) are not satisfied and the switch 25F is closed, a position signal $H_{CR}(t)$ that does not satisfy the conditions of equation (2) is inputted to the control rod position correcting unit 28, and it is determined by the following equations whether the liquid poison should be removed or injected to correct the position of the control rods 6 (step 28A):

$$H_{CR}(t) < H_{CR}^0 - \Delta h \tag{6}$$

$$H_{CR}(t) > H_{CR}^0 + \Delta h \tag{7}$$

When the conditions of equation (6) are satisfied, the liquid poison is removed; when the conditions of equation (7) are satisfied, it is injected.

When the conditions of equation (6) are satisfied, it is determined whether or not the relation of the following equation holds (step 28B):

$$H_{CR}(t) \geq H_{CR}^0 - \Delta h \tag{8}$$

When the answer is in the negative, a liquid poison injection rate signal $V_{CR}^{IN}$ is outputted (step 28C). When the answer is in the affirmative, an operation termination signal $S_{IN}$ for terminating the injection of the liquid poison is outputted (step 28D).

When the conditions of equation (7) are satisfied, it is determined whether or not the relation of the following equation holds in step 28E:

$$H_{CR}(t) \leq H_{CR}^0 + \Delta h \tag{9}$$

When the answer is in the negative, a liquid poison removing rate signal $V_{CR}^{OUT}$ is outputted (step 28F). When the answer is in the affirmative, an operation terminating signal $S_{OUT}$ for terminating the operation of removing the liquid poison is outputted (step 28G). The injection rate signal $V_{CR}^{IN}$, removing rate signal $V_{CR}^{OUT}$ and operation terminating signals $S_{IN}$ and $S_{OUT}$ are supplied to the liquid poison removing and injecting rates determining unit 27 as described hereinabove.

Figure 10:
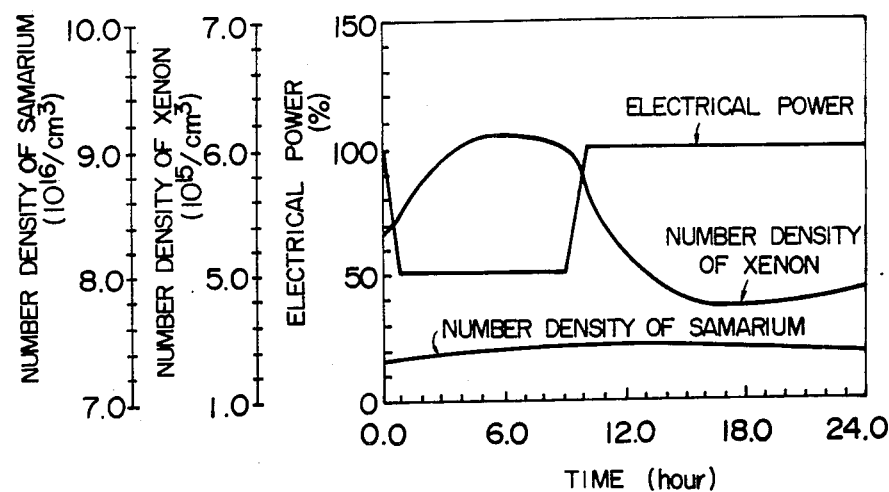
FIG. 10 is a view in explanation of the dynamic characteristic of xenon and samarium.
Figure 11:
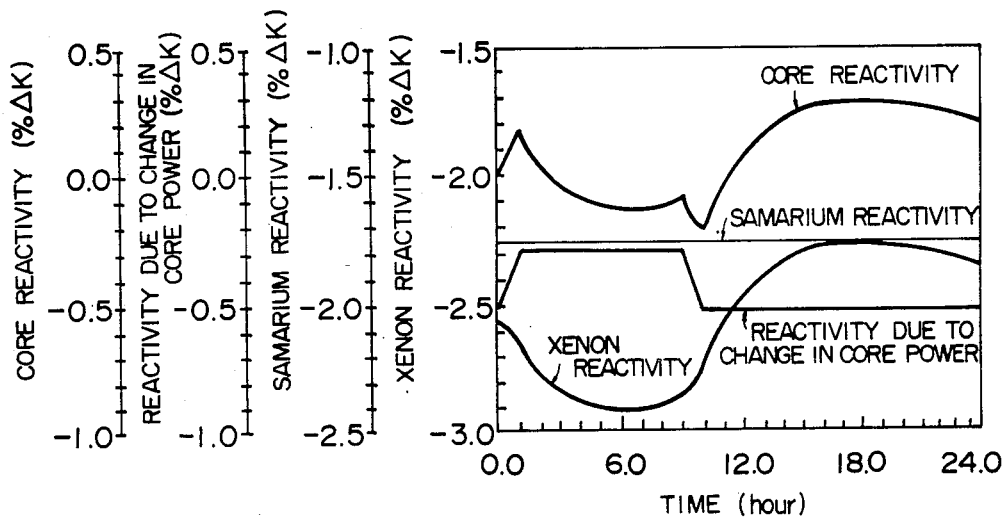
FIG. 11 is a characteristic view showing changes in reactor core reactivity.
Figure 12:
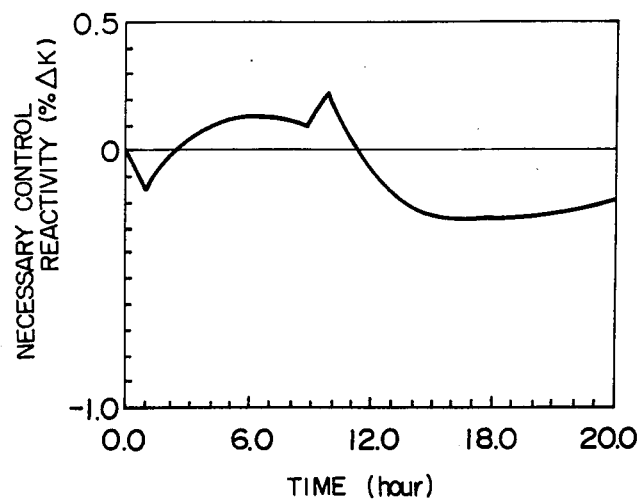
FIG. 12 is a characteristic view showing changes in necessary control reactivity.

The function of the liquid poison removing and injecting rates determining unit 27 will be described by referring to FIG. 9. The load variation program 37B is inputted from the overall reactor power control apparatus 33 to the liquid poison removing and injecting rates determining unit 27. First, in step 27A, dynamic characteristics, such as xenon number density, samarium number density, etc., corresponding to the load variation program 37B are obtained from a core point xenon kinetic model. More specifically, changes in the number densities are obtained by the following equations:

$$\frac{dI}{dt} = \phi \Sigma_f Y_i - \lambda_i I \tag{10}$$

$$\frac{dXe}{dt} = \phi \Sigma_f Y_x + \lambda_i I - (\lambda_x + \phi \sigma_a^x) Xe \tag{11}$$

$$\frac{dPm}{dt} = \phi \Sigma_f Y_p - \lambda_p Pm \tag{12}$$

$$\frac{dSm}{dt} = \phi \Sigma_f Y_s + \lambda_p Pm - (\lambda_s + \phi \sigma_a^s) Sm \tag{13}$$

where
t: time.
I: number density of iodine in the fuel.
Xe: number density of xenon in the fuel.
Pm: number density of promethium in the fuel.
Sm: number density of samarium in the fuel.
$\phi$: mean neutron flux in the fuel.
$\Sigma_f$: macroscopic absorption cross section in the fuel.
Y: production rate of each atom by fisson.
$\lambda$: decay constant of each atom.
$\sigma_a$: microscopic absorption cross section of each atom.
Data, such as $\Sigma_f$, Y, $\lambda$ and $\sigma_a$, necessary for calculation are stored in the liquid poison removing and injecting rates determining unit 27. FIG. 10 shows changes in the number densities of xenon and samarium obtained by equations (10)–(13) which correspond to the load variation program 37B. Then, changes in reactor core reactivity are obtained in step 27B. A change in reactor core reactivity is the sum of changes in reactivity corresponding to changes in the number densities of xenon and samarium and a change in reactivity corresponding to a change in reactor power. The changes in reactivity corresponding to the changes in the number densities of xenon and samarium and the change in reactor power can be obtained by proportional calculation done with respect to changes in the number densities of xenon and samarium and the change in reactor power. FIG. 11 shows the results of calculation done on the change in nuclear core reactivity together with the changes in reactivity corresponding to the changes in the number densities of xenon and samarium and the changes in reactivity (Doppler effect, void effect, moderator temperature reactivity) corresponding to the change in reactor power. In step 27C, changes in a control reactivity KB necessary for performing the load variation program 37A are obtained. As shown in FIG. 12, the control reactivity KB is equal in absolute value to the reactor core reactivity shown in FIG. 11 and only distinct therefrom in positive and negative signs. Thus, by introducing as a control reactivity a reactivity which is reversed in sign, it is possible to perform the load variation program 37 by causing the number of neutrons produced and the number of neutrons absorbed in the core to balance.

Figure 13:
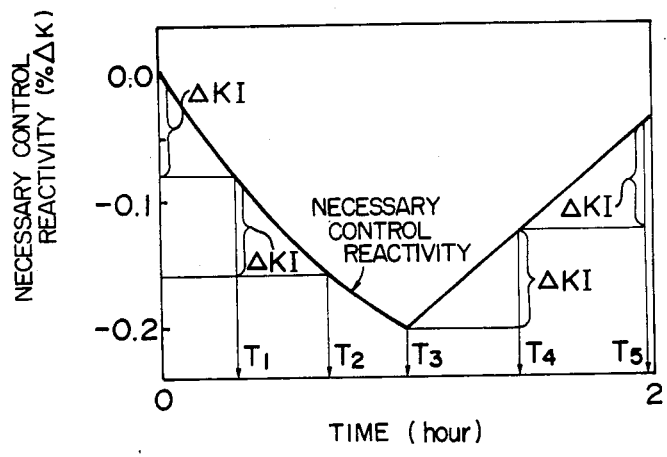
FIG. 13 is a view in explanation of determination of control time units.

In step 27D, control time units are set. As shown in FIG. 13, the control reactivity KB is split by using a time division reactivity ΔKI, to provide control time units corresponding to times $T_1$–$T_n$. The time division reactivity ΔKI is transmitted together with the load variation program 37A to the load follow-up control apparatus 24 from the control board 34. In the load variation program 37B, the time at which a fall in reactor power is initiated, the time at which the fall in reactor power is finished, the time at which a rise in reactor power is initiated and the time at which the rise in reactor power is finished are made to correspond to the control time units.

Figure 14:
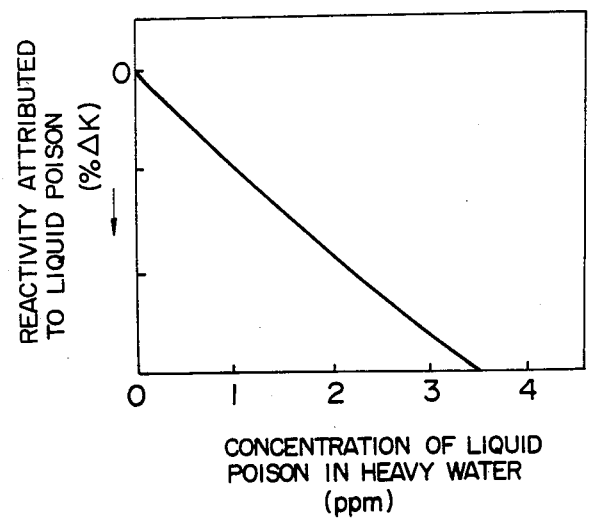
FIG. 14 is a characteristic view showing the concentration of the liquid poison in the heavy water in relation to the reactivity.
Figure 15:
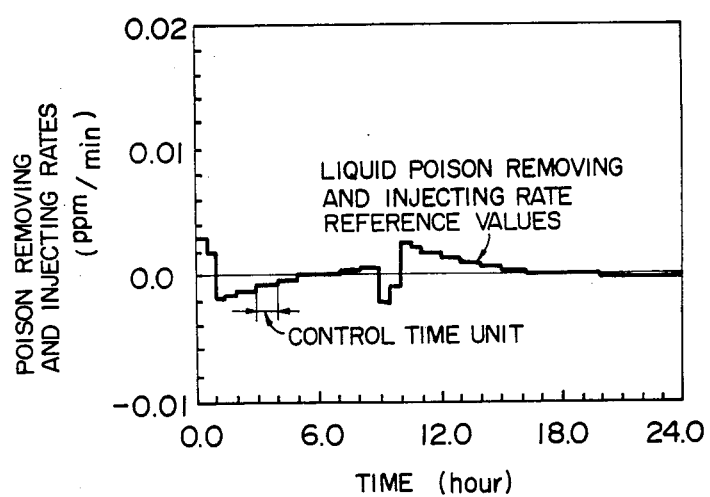
FIG. 15 is a characteristic view of the liquid poison removing and injecting reference rates.

In step 27E, the liquid poison removing and injecting reference rates $V_{base}$ each corresponding to one of the control time units set in step 27D obtained. The liquid poison removing and injecting base rate $V_{base}$ $(T_n-T_{n+1})$ for a period from a time $T_n$ to a time $T_{n+1}$ is obtained by the following equation:

$$V_{base}(T_n - T_{n+1}) = \frac{KB(T_{n+1}) - KB(T_n)}{T_{n+1} - T_n} \cdot \frac{1}{j} \quad (14)$$

where $T_n$ and $T_{n+1}$ are the nth and (n+1)th control time unit starting times respectively, and j is a reactivity of the liquid poison per unit concentration thereof. The value of j is obtained based on the relation between the liquid poison concentration in the heavy water and the reactivity attributed to the liquid poison shown in FIG. 14. FIG. 15 shows the results of calculation done on the liquid poison removing and injecting reference rate $V_{base}$ obtained in step 27E for the control time units are shown in FIG. 15. Positive values above zero of the ordinates are for liquid poison injection, and negative values below zero are for liquid poison removal. The results of calculation correspond to the load variation program 37B.

An output signal of step 27E or the rate signal shown in FIG. 13 is transferred to step 27F to which is also transferred to output $\Delta V_{CR}$ of the liquid poison removing and injecting rates correcting device 26. The reference rates $V_{base}$ corrected by the $\Delta V_{CR}$ in step 27F to provide corrected liquid poison removing and injecting rates $V_o$ which are expressed by the following equation:

$$V_o(t) = V_{base}(t) + \Delta V_{CR}(t) \quad (15)$$

The rates $V_o$ are thus modified to $V_o(t)$ and transferred to step 27G. When the injection rate signal $V_{CR}^{IN}$ or removing rate signal $V_{CR}^{OUT}$ from the control rod position correcting device 28 is not transferred to step 27G, the liquid poison removing or injecting rate $V_o(t)$ is inputted from step 27G to a liquid poison removal control unit 29A or liquid poison injection control unit 29B. Stated differently, when the value of $V_o(t)$ is negative, the $V_o(t)$ is outputted to the liquid poison removal control unit 29A, and when it is positive, the $V_o(t)$ is outputted to the liquid poison injection control unit 29B. If the injection rate signal $V_{CR}^{IN}$ or removal rate signal $V_{CR}^{OUT}$ is transferred to step 27G, then the injection rate signal $V_{CR}^{IN}$ takes priority over $V_o(t)$ and is inputted to the liquid poison injection control unit 29B in step 27G in place of the $V_o(t)$ or the removal rate signal $V_{CR}^{OUT}$ takes priority over the $V_o(t)$ and is inputted liquid poison removal control unit 29A in step 27G in place of the $V_o(t)$, even if the $V_o(t)$ is transferred from step G. The injection rate signal $V_{CR}^{IN}$ is cancelled when an operation interruption signal $S_{IN}$ is inputted to step 27G from the control rod position correcting device 28, and the removing rate signal $V_{CR}^{OUT}$ is cancelled when an operation interruption signal $S_{OUT}$ is inputted to step 27G from the control rod position correcting device 28. Stated differentialy, outputting of the signal $V_o(t)$ from step 27G is initiated.

The function of the introduced reactivity calculating unit 31 will be described by referring to FIG. 16. In the introduced reactivity calculating unit 31, a reactivity K(t) introduced in the core at a time t is obtained based on the position of the control rods 6 actually inserted in the reactor core and the concentration of the liquid poison in the heavy water, and a liquid poison injecting or removing rate V $(T_{n-1} \sim T_n)$ is obtained for a period from a time $T_{n-1}$ to time $T_n$ of the following day by incorporating a change $\Delta K$ $(T_{n-1} \sim T_n)$ occurring in a period from time $T_{n-1}$ to a time $T_n$ which are the control time units of the introduced reactivity (t). Operations performed to obtain the introduced reactivity K(t) and the liquid poison injecting or removing rate V $(T_{n-1} \sim T_n)$ will be described in detail.

The position signal $H_{CR}(t)$ of each control rod 6 outputted by each control rod position detector 8 is inputted to the introduced reactivity calculating unit 31. An output signal a of the liquid poison concentration meter 14 of the liquid poison injecting device 9 and an output signal $W_1$ of the flow meter 15 of the device 9 are inputted to the introduced reactivity calculating unit 31 via the liquid poison injection control unit 29B. An output signal $W_2$ of the flow meter 21 of the liquid poison removing device 16 is inputted to the introduced reactivity calculating unit 31 via the liquid poison removal control unit 29A (step 31A). The number of control rods 6 moved for a period $\Delta t_a$ (*five minutes, for example*) until the time t is obtained from the position signal $H_{CR}(t)$ of each control rod 6 at the time t (step 31B). Whether or not the control rods 6 have moved is determined based on whether $H_{CR}(t)=H_{CR}(o)$ or $H_{CR}(t)\neq H_{CR}(t)$ holds. If $H_{CR}(t)=H_{CR}(o)$ holds, the control rods 6 have moved during the period $\Delta t_a$; if $H_{CR}(t)\neq H_{CR}(o)$ holds, the control rods 6 have not moved. $H_{CR}(o)$ represents the position of the control rods 6 at a time earlier by $\Delta t_a$ than the time t. The period $\Delta t_a$ is stored in the memory of the introduced reactivity calculating unit 31. The period $\Delta t_a$ for which any number may be arbitrarily selected may be inputted through the control board 34.

The introduced reactivity C(t) introduced in the reactor core by all the control rods 6 moved during the period $\Delta t_a$ is obtained by the following equation:

$$C_{Oi}(t) = C_{Ai}(t) - C_{Ai}(o) \quad (16)$$

Figure 17:
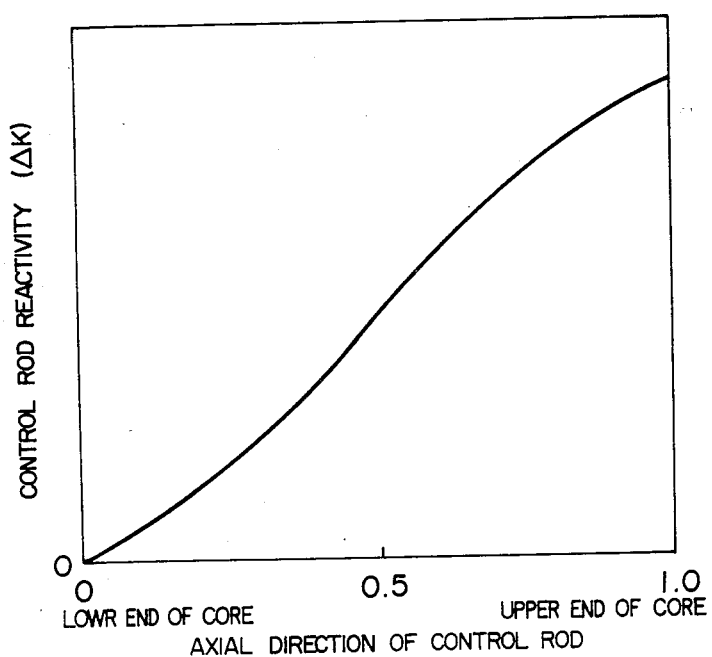
FIG. 17 is a characteristic view of the control rod position in relation to the introduced reactivity.

$C_{Ai}(t)$ is a control rod reactivity corresponding to $H_{CRi}(t)$, and $C_{Ai}(o)$ is a control rod reactivity corresponding to $H_{CRi}(o)$. i indicates the number of control rods 6 that have moved, and includes 1, 2, ..., n. Based on the characteristics shown in FIG. 17, the $C_{Ai}(t)$ and $C_{Ai}(o)$ have values corresponding to the positions of the control rods 6 or $H_{CRi}(t)$ and $H_{CRi}(o)$.

Thus, the introduced reactivity C(t) is expressed by the following equation:

$$C(t) = \sum_{i=1}^{n} C_{Oi} \quad (17)$$

When the introduced reactivity attributed to the control rods 6 withdrawn from the reactor core is greater than the introduced reactivity attributed to the control rods 6 inserted in the reactor core during the period $\Delta t_a$, the C(t) has a positive value. When the former introduced reactivity is smaller than the latter introduced reactivity, the C(t) has a negative value. Then, a liquid poison injecting time $\Delta T_1$ and a liquid poison removing time $\Delta T_2$ during a period $\Delta t_a$ until the time t are obtained (step 31D). The times $\Delta T_1$ and $\Delta T_2$ are obtained as follows.

Whether or not injection of liquid poison has been performed and whether or not removal of liquid poison has been performed are determined based on flow signals $W_1$ and $W_2$. When the liquid poison injection operation and removal operation have not been performed, the flow signals $W_1$ and $W_2$ are both zero; when the injection and removal operations have both been performed, the signals have values greater than zero.

The liquid poison injecting time $\Delta T_1$ for the period $\Delta t_a$ is determined as described in paragraphs (i)–(iv) with periods $\Delta t_a$, $\Delta t_b$ and $\Delta t_c$ having the following relation $\Delta t_a > \Delta t_b > \Delta t_c$:

(i) When $W_1 > 0$ for a period between $(t - \Delta t_b)$ and $t$, $\Delta T_1 = \Delta t_b$;

(ii) When $W_1 > 0$ for the period $\Delta T_1 = \Delta t_1$;

(iii) When $W_1 > 0$ for a period between $(t - \Delta t_a)$ and $(t - \Delta t_b)$, $\Delta T_1 = \Delta t_a - \Delta t_b$; and (iv) When $W_1 > 0$ for a period between $(t - \Delta t_b)$ and $(t - \Delta t_c)$, $\Delta T_1 = \Delta t_a - \Delta t_b$.

The liquid poison removing time $\Delta T_2$ for the period $\Delta t_a$ is determined as described in paragraphs (v)–(viii):

(v) $W_2 > 0$ for the period between $(t - \Delta t_b)$ and $t$, $\Delta T_2 = \Delta t_b$;

(vi) When $W_2 > 0$ for the period $\Delta t_a$, $\Delta T_2 = \Delta t_a$;

(vii) When $W_2 > 0$ for the period between $(t - \Delta t_a)$ and $(t - \Delta t_b)$, $\Delta T_2 = \Delta t_a - \Delta t_b$; and (viii) When $W_2 0$ for the perior between $(t - \Delta t_b)$ and $(t - \Delta t_c)$, $\Delta T_2 = \Delta t_b - \Delta t_c$. In step 31E, calculation is done on an introduced reactivity $P(t)$ introduced during the period $\Delta t_a$ by adjusting the concentration of the liquid poison by using the liquid poison injecting time $\Delta T_1$ and liquid poison removing time $\Delta T_2$ obtained in step 31D, by the following $$P(t) = f(a, \Delta T_1) + f(W_2, \Delta T_2) \tag{18}$$

Figure 18:
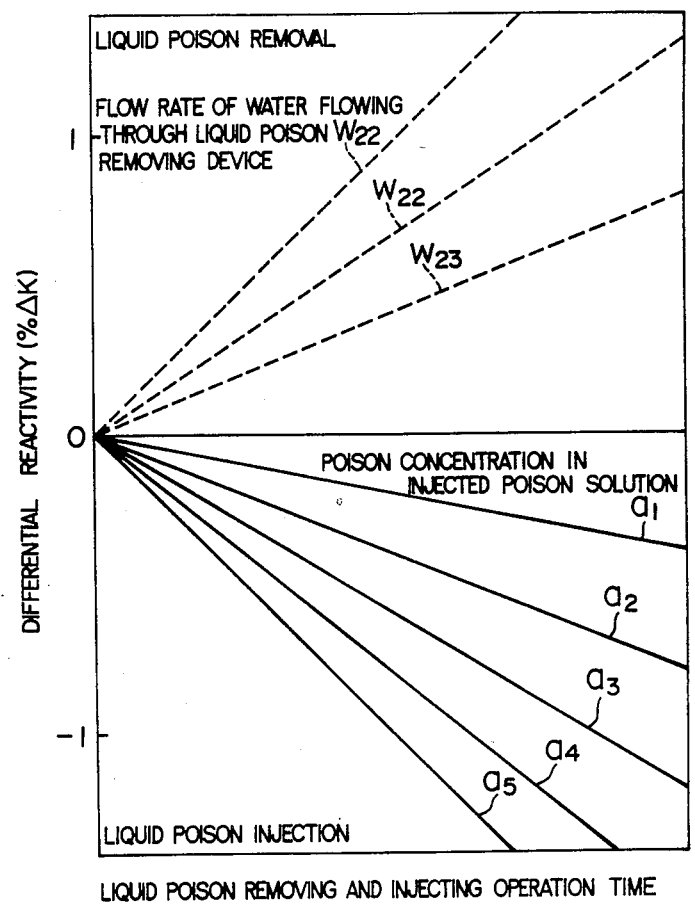
FIG. 18 is a charactierstic view of the liquid poison removing and injecting operation time in relation to the introduced reactivity.

The f $(a, \Delta T_1)$ and f $(W_2, \Delta T_2)$ are obtained based on the characteristics shown in FIG. 18. The value of the former is obtained from the characteristic of solid lines in FIG. 18, and that of the latter is obtained from the characteristic of broken lines in FIG. 18. The characteristic of the solid lines is shown by using the concentration a of the introduced liquid poison as a parameter, and the characteristic of the broken lines is shown by using the flow rate $W_2$ of the liquid poison supplied to the liquid poison removing toward 18 as a parameter. The value of $P(t)$ is positive when the introduced reactivity attributed to the removal of the liquid poison is greater than the introduced reactivity attributed to the injection of the liquid poison, and its value is negative when the former reactivity is smaller than the latter reactivity.

A reactor power (thermal output of a reactor) undergoes a gradual change as the degree of burnup of the fuel increased for it is affected by a change in the power coefficient caused by deterioration of fuel and other factor. Such change in reactor power is very small in magnitude in initial stages of a load follow-up operation. However, the magnitude of change accumulated becomes great when 80 days have passed since the initiation of the operation. That is, the magnitude of change occurring in the reactor power on the 80th day of operation is equal to the magnitude of change occurring in the reactor power as a result of manipulation of the control rods for 1440 times or 18 times a day. Thus, the change in reactor power caused by a change in the power coefficient of the core can be compensated for if the introduced reactivity introduced in one day by manipulating the control rods 18 times is split into parts by the period of time $\Delta t_a$ and each part is introduced into the core during each period $\Delta t_a$. A correction $m(t)$ to the made to the introduced reactivity at the time $t_a$ is obtained by the following equation (step 31F):

$$m(t) = \Delta PK \cdot \Delta POWER(t) \tag{19}$$

where $\Delta PK$ is a change per day in the core reactivity which corresponds to a change of 1% of the reactor power, and $\Delta POWER(t)$ is a change in the reactor power for the period $\Delta t_a$ until the time $t$.

Then, a total introduced reactivity $\Delta K(t)$ introduced into the core at the time $t$ after lapse of the period $\Delta t_a$ is obtained by the following equation (step 31G):

$$\Delta K(t) = C(t) + P(t) \, m(t) \tag{20}$$

Thereafter, a control time unit $T_n$ is set (step 31H). That is, the present time $t$ is the control time unit $T_n$. the time $(t - \Delta t_a)$ which is earlier by $\Delta t_a$ than the time $t$ is a control time unit $T_{n-1}$.

The liquid poison removing and injecting rates $(T_{n-1} \sim T_n)$ for the period $\Delta t_a$ between the control time unit $T_{n-1}$ and the control time unit $T_n$ of the next following day are obtained from the following equation (step 31I):

$$V(T_{n-1} \sim T_n) = \frac{\Delta K(t)}{T_n - T_{n-1}} \times \frac{1}{\alpha} \text{ (ppm/min)} \tag{21}$$

where $\alpha$ is a value for conversion of the concentration of a liquid poison ($\Delta K$/ppm).

The liquid poison removing and injecting rates $V(T_{n-1} \sim T_n)$ and introduced reactivity $\Delta K(T_{n-1} \sim T_n)$ obtained for the control time units after the initiation of a fall in the reactor power according to the load variation program 37B are inputted to the liquid poison removing and injecting rates indicating unit 32.

Figure 19:
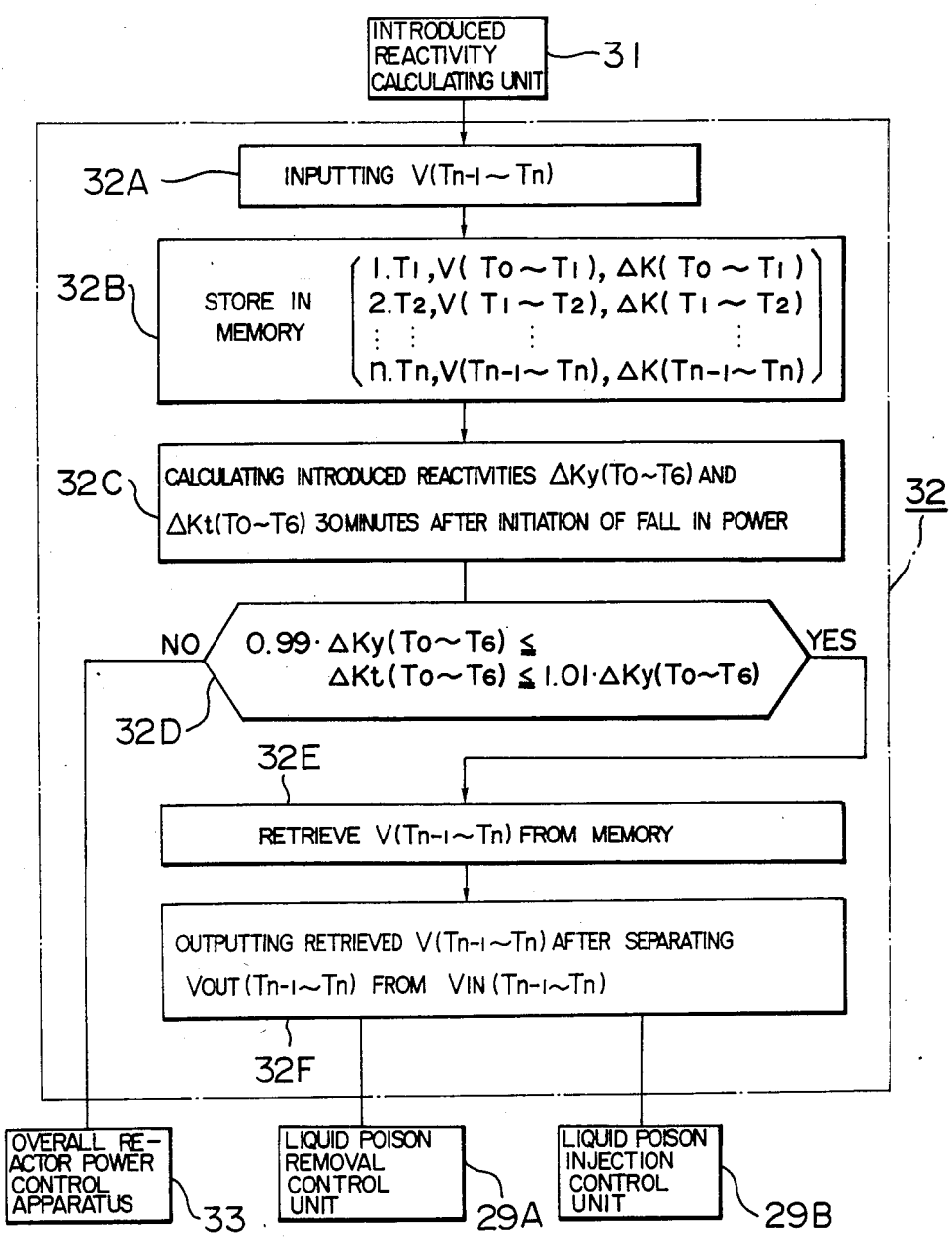
FIG. 19 is a flow chart showing the function of the liquid poison removing and injecting rates providing unit shown in FIG. 2.

FIG. 19 shows the liquid poison removing and injecting rates providing unit 32 which receives as its inputs from the introduced reactivity calculating unit 31 the values of the liquid poison removing and injecting rates $V(T_0 \sim T_1)$, $V(T_1 \sim T_2)$ ... $V(T_{n-1} \sim T_n)$ and $\Delta K(T_0 \sim T_1)$, $\Delta K(T_1 \sim T_2)$ ... $\Delta K(T_{n-1} \sim T_n)$ corresponding to the control time units $T_1$, $T_2$ ... $T_{n-1}$ and $T_n$ respectively (step 32A) and stores these values in a memory (magnetic disc, magnetic drum, etc.) (step 32B). The control time units $T_1$, $T_2$ ... $T_n$ cover a period from the initiation of the load follow-up operation to the time $T_1$, a period from the time $T_1$ to the time $T_2$ ... a period from the time $T_{n-1}$ to the time $T_n$, repsectively. The value of $V(T_{n-1} \sim T_n)$ is for a period between the time $T_{n-1}$ and the time $T_n$ of the next following day, but the value of $\Delta K(T_{n-1} \sim T_n)$ is for a period between the time $T_{n-1}$ and the time $T_n$ of today. These values are inputted from the introduced reactivity calculating unit 31 and stored in the memory every day.

Then, an introduced reactivity $\Delta K(t_0 \sim T_6)$ is obtained for today and the day before for a period of 30 minutes (arbitrarily selected) following the initiation of a fall in the reactor power in a load follow-up operation (step 32C). The introduced reactivity $\Delta K_Y(T_0 \sim T_6)$ of the day before represents the sum of $\Delta K(T_0 \sim T_1)$ ... $\Delta K(T_5 \sim T_6)$ of the day before stored in the memory. The introduced reactivity $\Delta K_t(T_0 \sim T_6)$ of today represents the sum of $\Delta K(T_0 \sim T_1)$ ... $\Delta K(T_5 \sim T_6)$ of today stored in the memory. The introduced reactivities are control reactivities necessary for performing the load variation program 37A shown in FIG. 12. The value of $\Delta K_t(T_0 \sim T_6)$ for the first day of a load follow-up operation according to the load variation program 37A can be obtained, but the value of $\Delta K_y(T_0 \sim T_5)$ for the day before is naturally zero. The values of $\Delta K_t(T_0 \sim T_6)$ and $\Delta K_y(T_0 \sim T_6)$ are compared with each other (step 32D) by the following equation:

$$0.99 \Delta K_y(T_0 \sim T_6) \leq \Delta K_t(T_0 \sim T_6) \leq 1.01 \Delta K_y(T_0 \sim T_6) \quad (22)$$

When $\Delta K_t(T_0 \sim T_6)$ does not satisfy conditions of equation (22), a NOT signal is outputted in step 32D and inputted to the overall reactor power control apparatus 33 which holds the switch 35 closed upon receipt of the NOT signal. That is, when $\Delta K_t(T_0 \sim T_6)$ does not satisfy the conditions of equation (22), a load follow-up operation by the load follow-up control unit 24 or the load fllow-up operation (FIG. 9) based on predictions [predictions based on equations (10) and (11)] having a correcting function is performed continuously even after the time $T_6$ of today.

When $\Delta K_t(T_0 \sim T_6)$ satisfies the conditions of equation (22), a YES signal is outputted in step 32D. Strictly speaking, the YES signal is preferably outputted when $\Delta K_t(T_0 \sim T_6) = \Delta K_y(T_0 \sim T_6)$. However, since an output signal of a detector might contain an error, comparison of $\Delta K_t(T_0 \sim T_6)$ with $\Delta K_y(T_0 \sim T_6)$ may be performed in an allowable range of $\pm 1\%$ as shown in equation (22). $\Delta K_t(T_0 \sim T_6)$ might become greater than $\Delta K_y(T_0 \sim T_6)$ by an amount corresponding to the difference of correction m(t). However, the difference is small for one day and falls within $\pm 1\%$. When the YES signal is outputted, the liquid poison removing and injecting rates $V(T_{n-1} \sim T_n)$ for a period after a time $T_7$ which were obtained the day before (in step 31I shown in FIG. 16) and stored in the memory in step 32E are successively retrieved from the memory in conformity with the passage of time today. The retrieved liquid poison removing and injecting rates $V(T_{n-1} \sim T_n)$ are outputted separately by being divided into a liquid poison removing rate $V_{OUT}(T_{n-1} \sim T_n)$ and a liquid poison injection rate $V_{IN}(T_{n-1} \sim T_n)$ in step 32F. The liquid poison removing rate $V_{OUT}(T_{n-1} \sim T_n)$ which is negative in value is supplied to the liquid poison removal control unit 29A. The liquid poison injecting rate $V_{IN}(T_{n-1} \sim T_n)$ which is positive in value is supplied to the liquid poison injection control unit 29B.

The YES signal is inputted to the overall reactor power control apparatus 33 as soon as it is outputted in step 32D. When the YES signal is inputted to the control apparatus 33, the control apparatus 33 opens the switch 35. Thus, if $\Delta K_t(T_0 \sim T_6)$ satisfies the conditions of equation (22), then the load follow-up control effected by the load follow-up control unit 24 is terminated and a load follow-up control is performed by the constant load follow-up apparatus 30. The load follow-up control performed by the constant load follow-up apparatus 30 is based on the load variation program 37A and performed continuously so long as $\Delta K_t(T_{n-1} \sim T_n)$ satisfies the conditions of equation (22). When the load follow-up control is performed by the constant load follow-up control apparatus 30, the liquid poison removing and injecting rates providing unit 32 retrieves from the memory the liquid poison removing and injecting rates $V(T_{n-1} \sim T_n)$ based on the introduced reactivity of the day before which were obtained in step 31I of the introduced reactivity calculating unit 31 and output them to the liquid poison removal control unit 29A or the liquid poison inject on control unit 29A at all times.

The function of the load follow-up operation control system has been described. A load follow-up operation method performed by using this load follow-up operation control system will now be described in chronogical sequence.

When a load follow-up operation is performed in accordance with the load variation program 37A in a pressure tube type nuclear reactor operated to provide a 100% electrical power, the operator manipulates the control board 34 which gives instructions to the overall reactor power control apparatus 33 which in turn closes the switch 35. The load variation program 37A for providing a thermal power output is converted by the control apparatus 33 to the load variation program 37B for providing a reactor power (thermal power) which is outputted to the load follow-up control unit 24.

Figure 9:
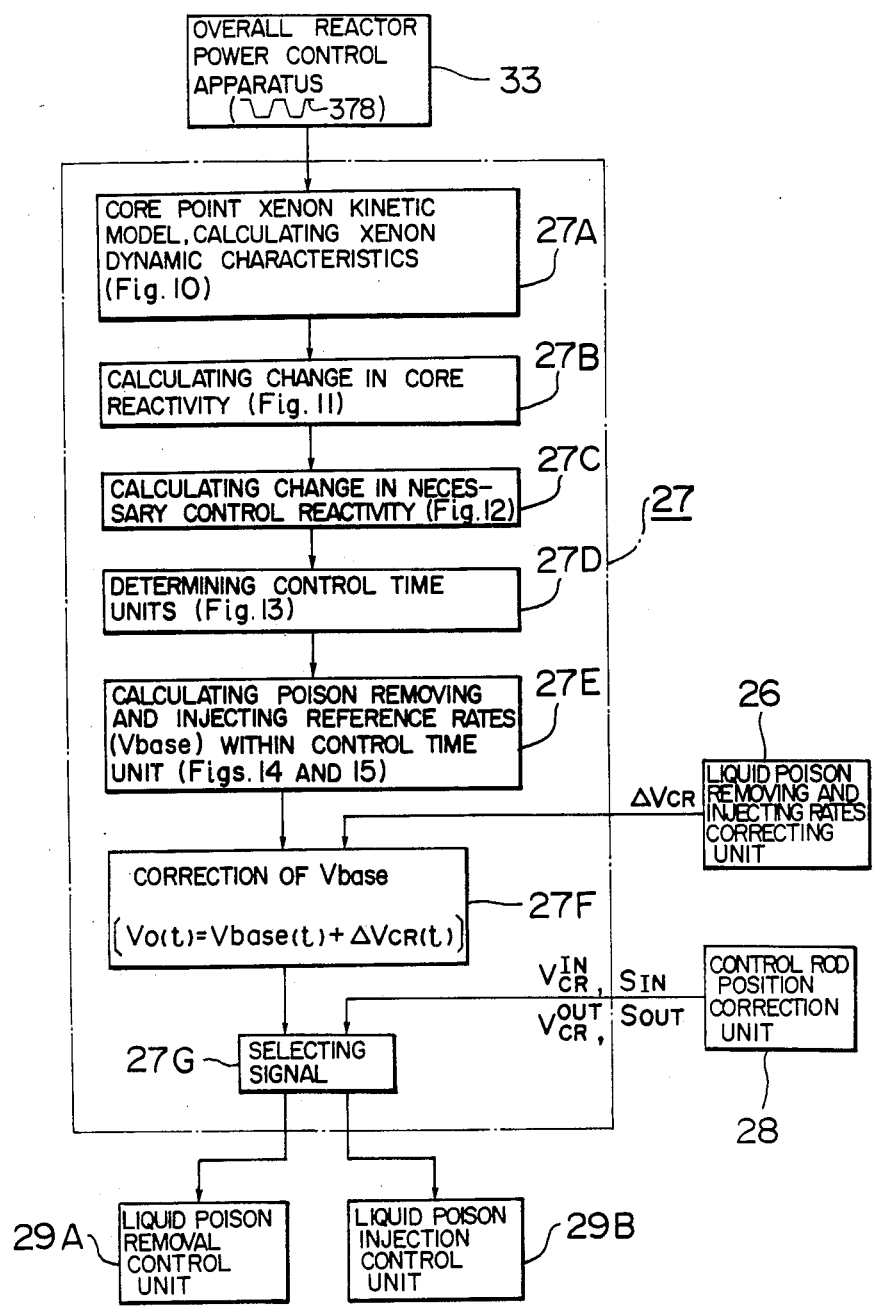
FIG. 9 is a flow chart showing the function of the liquid poison removing and injecting rates determining device shown in FIG. 4.

The liquid poison removing and injecting rates determinating unit 27 of the load follow-up control apparatus 24 calculates the liquid poison removing and injecting reference rates $V_{base}$ in accordance with steps 27A-27E shown in FIG. 9. Immediately after the load follow-up operation is started in accordance with the load variation program 37B and the reactor power begins to fall, $V_o(t) = V_{base}$ because $\Delta V_{CR}(t)$ is zero, so that an injection of liquid poison is started based on $V_{base}$. That is, $V_o(t)$ which is positive in value is inputted to the liquid poison injection control unit 29B which opens the stop value 12 and brings the flow control valve 13 to a predetermined opening, to supply a liquid poison from the liquid poison tank 11 to the heavy water circulating line 5 via the line 10. The liquid poison injection control unit 29B effects feedback control by inputting the output signal $W_1$ of the flow meter 15 and adjusting the opening of the flow control valve 13 to a predetermined level, to being a predetermined value to $V_o(t)$. The liquid poison supplied in this way is led together with the heavy water to the calandria tank 1 to thereby lower the reactor power. As the reactor power begins to fall as a result of introduction of the liquid poison, the reactor power is influenced by the number density of xenon in the core and tends to deviate from the load variation program 37B which is the reference line and rise above the upper limit value 38 or fall below the lower limit value 39. This means that the prediction made by using the core point xenon kinetic model of equations (10)–(13) defects from the actual change. When this is the case, the block 25C functions to drive the control rod drive mechanisms 7, to insert into or withdraw from the reactor core the drive rods 6 connected to the mechanisms 7, to adjust the reactor power to lie between the upper limit value 38 and lower limit value 39. The introduced reactivity obtained by the movement of the control rods 6 is added to the reference rates $V_{base}$ in step 27F of the liquid poison removing and injecting rates determining unit 27 as a correction $\Delta V_{CR}(t)$ to be made to the liquid poison removing and injecting rates for the next following mean differential time $\Delta t$ (10 minutes) obtained in steps 26A–26E of the liquid poison removing and injecting rates correcting device 24. In the next following mean differential time $\Delta t$, the liquid poison is injected into the heavy water based on $V_o(t)$ added with $\Delta V_{CR}(t)$ Thus, the introduced reactivity attributed to the movement of the control rods 6 is compensated for by a change in the concentration of the liquid poison, thereby enabling the number of times of operation of the control rods 6 after the next following mean differential time.

The control rod position signal $H_{CR}(t)$, liquid poison concentration signal a and flowrate signals $W_1$ and $W_2$ are inputted to the introduced reactivity calculating unit 31 which performs operations of steps 31B–31I, to obtain liquid poison removing and injecting rates V ($T_{n-1} \sim T_n$) for a period $\Delta t_a$ between $t_{a-1}$ and $T_a$ of the next following day. The values obtained are stored in the memory in step 32B of the liquid poison removing and injecting rates providing unit 32 at all times. Also, the introduced reactivity calculating unit 31 obtains introduced reactivity $\Delta K_t$ ($T_0 \sim T_6$) as shown step 32C at a point in time ($T_0$) at which 30 minutes ($\Delta T_0$) has elapsed since the initiation of a fall in the reactor power. The point in time at which load follow-up operation is initiated is the first day of the load follow-up operation and the introduced reactivity $\Delta K_y$ ($T_0 \sim T_6$) of the day before is zero. Thus, the liquid poison removing and injecting rates providing unit 32 outputs a NOT signal to the overall nuclear power control apparatus 33, so that the switch 35 remains closed and the load follow-up operation of the first day is controlled by the load follow-up control unit 24.

Figure 16:
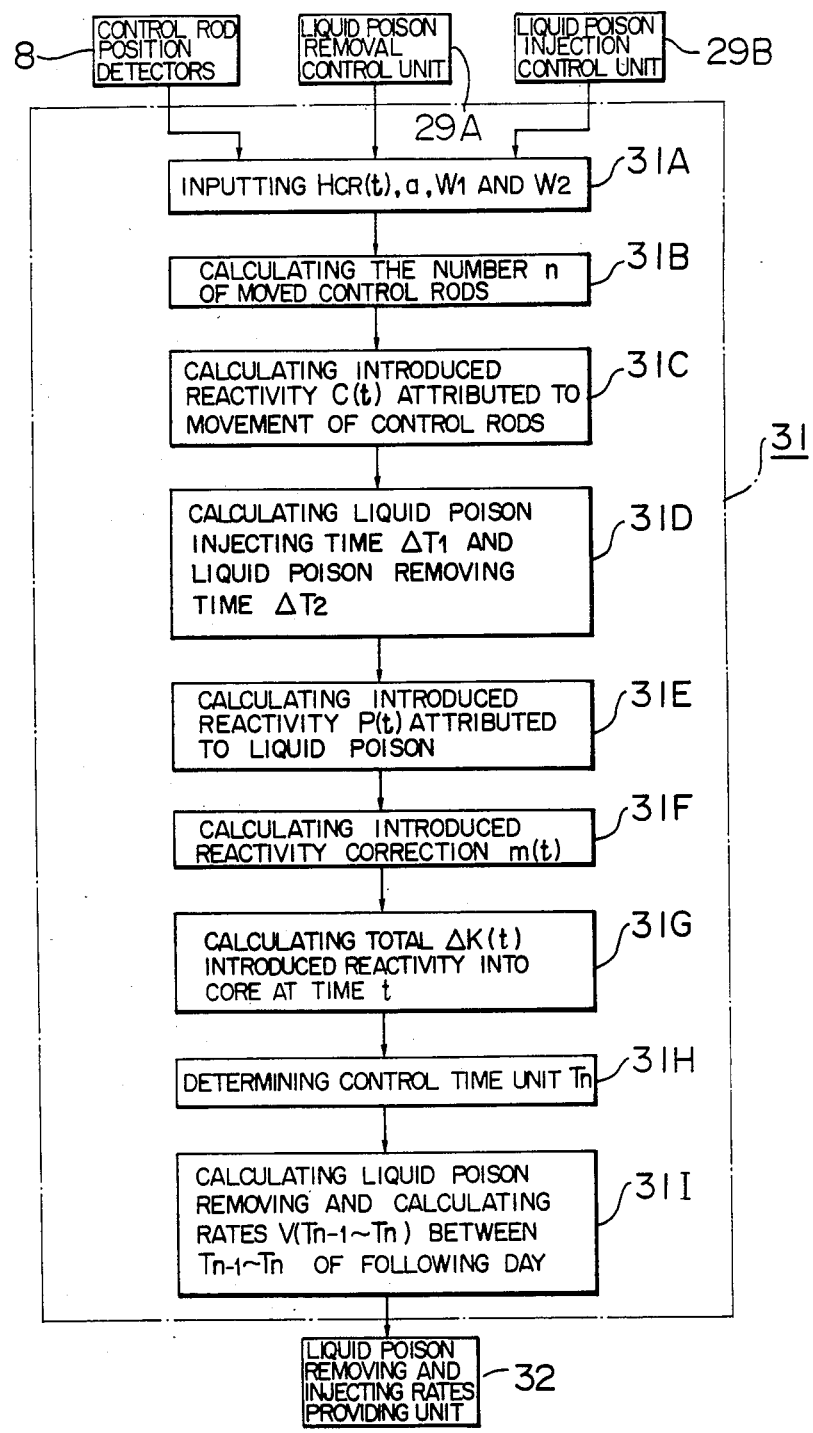
FIG. 16 is a flow chart showing the function of the introduced reactivity calculating unit shown in FIG. 2.

When one hour has elapsed following the initiation of the load follow-up operation, removal of the liquid poison is performed as shown in FIG. 16. Removal of the liquid poison is effected by inputting $V_o(t)$ which is negative in value from the liquid poison removing and injecting rates determining device 32 to the liquid poison removal control unit 29A which, upon recept of negative $V_o(t)$, opens the stop valves 19 and 20 and reduces the opening of the flow control valve 22 to enable the $V_o(t)$ to be obtained. The output signal $W_2$ of the flow meter 21 is inputted to the liquid poison removal control unit 29A which effects feedback control of $V_o(t)$. The liquid poison in the heavy water is removed therefrom by ion exchange resin in the removing tower 18, resulting in a fall in the concentration of the liquid poison in the heavy water. This compensates for a reduction in the reactor power cause by a reduction in the concentration of xenon, thereby keeping the reactor power constant. When the control rods 6 are manipulated to keep the reactor power between the upper limit value 38 and lower limit value 39, a correction $\Delta V_{CR}(t)$ is obtained and taken into consideration in effecting liquid poison concentration control in the next and following mean differential time $\Delta t$, in the same manner as described hereinabove. Between 1 and 9 hours during which the reactor power is kept constant, removal and injection of the liquid poison are performed in accordance with changes in the concentration of xenon.

When it is desired to raise the reactor power to a high level after low power operation is finished, the liquid poison removing device 16 is actuated by the negative $V_o(t)$ outputted by the liquid poison removing and injecting rates determining unit 27.

As the reactor power reaches a high level, the liquid poison injecting device 9 is first manipulated and then the liquid poison removing device 16 is manipulated after lapse of time, to keep the reactor power at a 100% level. The correction $\Delta V_{CR}(t)$ is naturally added in effecting control of the condensation of liquid poison.

In performing load follow-up operation (load follow-up operation of a first load variation cycle) for a first day (24 hours after initiation of load follow-up operation), a changing rate of liquid poison concentration is provided, when the control rods 6 deviate from an allowable range of movements centering on an initial position (reference position $H_{CR}^O$, to compensate for the deviation by the control rod position correcting unit 28 in steps 28C and 28F. The changing rate of liquid poison concentration is outputted from the liquid poison removing and injecting rate determining unit 27 to the liquid poison removal control unit 29A or liquid poison injection control unit 29B. Thus, the introduced reactivity due to the aforesaid deviation is replaced by an introduced reactivity due to a change in the concentration of liquid poison, so that the control rods 6 are restored to the allowable range of movements.

In performing load follow-up operation (load follow-up operation of a second load variation cycle) for a second day, the operation is performed based on the value [amended by $V_{CR}(t)$] predicted by the load follow-up control apparatus 24 until 30 minutes elapses. $\Delta K_t$ ($T_0 \sim T_6$) which is the introduced reactivity of the second day and $\Delta K_y$ ($T_0 \sim T_6$) which is the introduced reactivity of the first day are compared with each other in step 32D of the liquid poison removing and injecting rates providing unit 32. As can be seen clearly in a characteristic 4 in FIG. 1, the introduced reactivity obtained in the first 30 minutes of the second day is much higher than the corresponding introduced reactivity of the first day. The introduced reactivity is equal in absolute value to the core reactivity of the characteristic 4 and only distinct from it in sign as to whether it is positive or negative. Therefore, comparison of $\Delta K_y$ ($T_0 \sim T_6$) and $\Delta K_t$ ($T_0 \sim T_6$) may be performed with regard to the core reactivity, not the introduced reactivity.

Although the liquid poison removing and injecting rates for the control time unit $T_n$ of the second day obtained in the first day are stored in the memory as described hereinabove, load follow-up operation is performed after $T_6$ on the second day based on the value predicted by the load follow-up control apparatus 24, because the introduced reactivity of the first day differs from that of the second day.

In performing load follow-up operation (load follow-up operation of a third load variation cycle), the operation is performed by the load follow-up control apparatus 24 until 30 minutes elapses as is the case with the operation for the second day. At a point in time at which 30 minutes has elapsed following initiation of the operation, $\Delta K_y$ ($T_0 \sim T_6$) which is the introduced reactivity of the second day is compared with $\Delta K_t$ ($T_0 \sim T_6$) which is the introduced reactivity of the third day in step 32D. As can be clearly seen in the characteristic 4 shown in FIG. 1, they are equal in value. Thus, a YES signal is outputted from the liquid poison removing and injecting rates providing unit 32 to the overall reactor power control apparatus 33 to open the switch 35, thereby terminating the control effected on the basis of the value prodicted by the load follow-up control apparatus 24. Thereafter, load follow-up operation is performed based on the liquid poison removing and injecting rates V ($T_{n-1} \sim T_n$) outputted from the liquid poison removing and injecting rates providing unit 32. This load follow-up operation is performed based on a reactivity actually introduced on the previous day. Thus, when an introduced reactivity is equal to a reactivity introduced on the previous day, load follow-up operation is advantageously performed based on a liquid poison removing or injecting rate V ($T_{n-1} \sim T_n$) obtained on the basis of a reactivity actually introduced on the previous day, because the need to perform calculation to obtain a value by prediction can be eliminated. This is conducive to increased safety of the nuclear reactor because load follow-up operation performed by taking the concentration of xenon into consideration is facilitated. Also, the number of times of operation of the control rods in performing load follow-up operation on the next following day is greatly reduced, thereby markedly reducing the possibilities of damage to the fuel.

On a fourth day and after, load follow-up operation is performed based on outputs of the liquid poison removing and injecting rates providing unit 32.

The liquid poison removing and injecting rates described hereinabove refers to liquid poison concentration changing rates. Liquid poison injection means an increase in liquid poison concentration; liquid poison removal means a decrease in liquid poison concentration.

Figure 20:
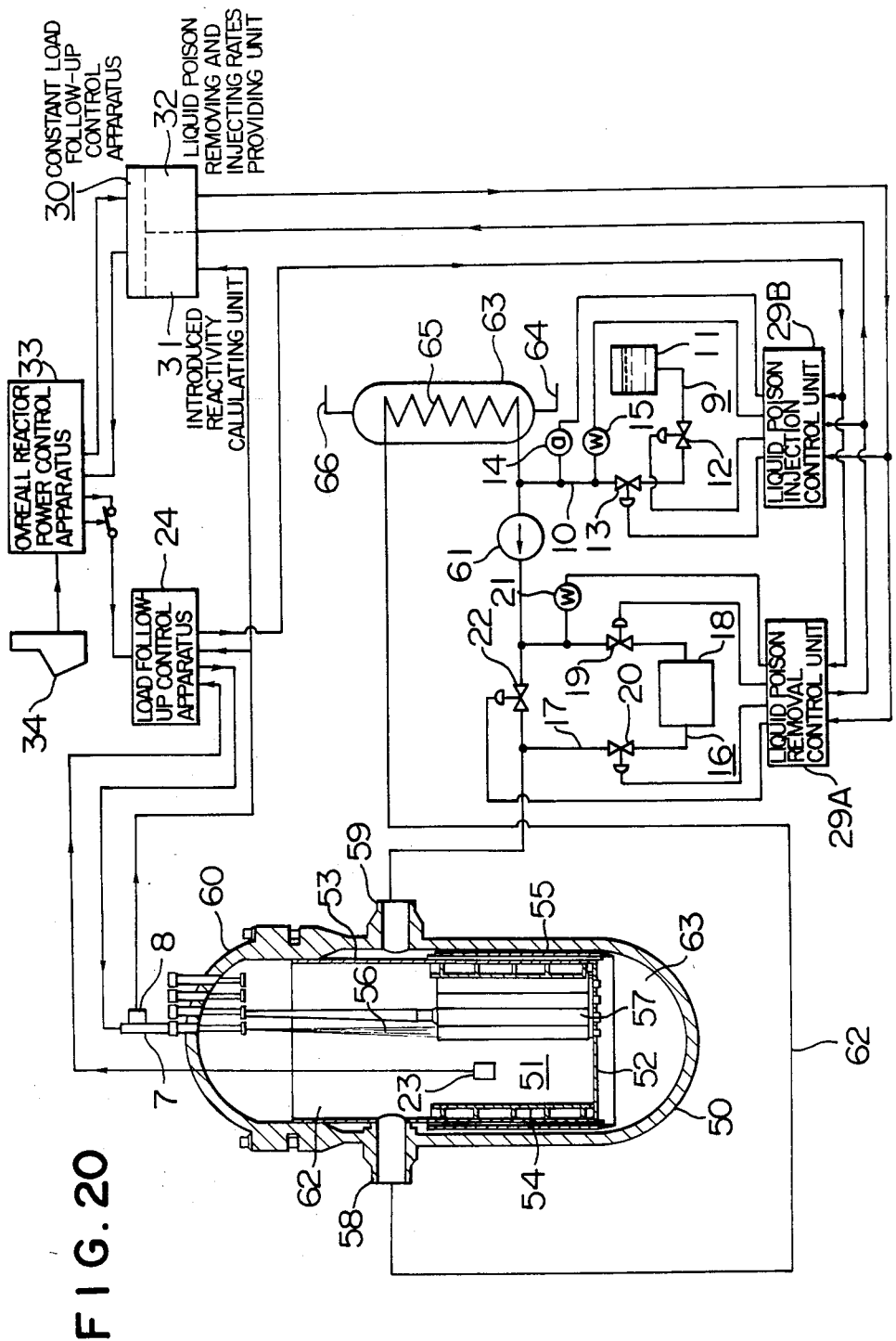
FIG. 20 is a systematic view of another form of load follow-up operation control system suitable for carrying another embodiment of the invention into practice in a pressurized-water nuclear reactor.

The method of operation control according to the invention can also be carried into practice in a pressurized-water nuclear reactor which, like a pressure tube type nuclear reactor, also relies on manipulation of the control rods and adjustments of the concentration of a liquid poison for effecting reactor power control. Another embodiment of the invention will be described by referring to a pressurized-water reactor shown in FIG. 20.

The pressurized-water reactor comprises, as shown, a reactor vessel 50, a core 51, a lower core support plate 52, a core tank 53, buffer plates 54 interposed between the core tank 53 and core 51, a thermal shield 55 interposed between the core tank 53 and reactor vessel 50, a multiplicity of control tubes 56 in which control rods are inserted, and fuel assemblies 57 located in the core 51. The control rods are connected to control rod drive mechanisms 7 having position detectors 8.

The reactor vessel 50 includes a lid 60, an inlet nozzle 59 and an outlet nozzle 58. Cooling water containing a liquid poison flows through a primary cooling system 62 and via the inlet nozzle 59 into a lower plenum 63 of the reactor vessel 50 as a pump is actuated. The cooling water is further supplied to the core 51 where it is heated and discharged through an upper plenum 62 and via the outlet nozzle 58 into the primary cooling system 62, so that the cooling water of high temperature is led to a heat transfer tube 65 of a steam generator 63. Feedwater is supplied to the side of a shell of the steam generator 63 through a feedwater line 64, so that heat exchange takes place between the feedwater of low temperature and the cooling water of high temperature to turn the feedwater to steam which flows into a main steam line 66.

Like the first embodiment, this embodiment has a liquid poison injecting device 9 and a liquid poison removing device 16 of the same construction as the corresponding devices of the first embodiment. A load follow-up operation control system for the pressurized-water reactor of the aforesaid construction comprises a load follow-up control apparatus 24, a liquid poison removal control unit 29A, a liquid poison injection control unit 29B, a constant load follow-up control apparatus 30, an overall reactor power control apparatus 33 and a control board 34.

The second embodiment of the operation control method according to the invention can be performed in the pressurized-water nuclear reactor of the aforesaid construction by using the load follow-up operation control system of the aforesaid construction in the same manner as described by referring to the first embodiment, so that detailed description will be omitted.

What is claimed is:

1. An operation control method for a nuclear reactor wherein the reactor power of the nuclear reactor having first control means for effecting coarse adjustments of the reactor power and second control means for effecting fine adjustments of the reactor power is controlled in accordance with a predetermined load variation schedule in which variations in load within a predetermined time period are cyclically repeated and which is distinct from a previously followed load variation schedule, comprising the steps of:
   obtaining a reactivity introduced by operating the control means in a first cycle of said load variation schedule;
   obtaining a manipulated variable of said second control means for a second cycle of the load variation schedule which follows the first cycle based on the reactivity introduced in the first cycle; and
   effecting control of the reactor power by actuating the second control means in the second cycle based on the manipulated variable obtained in the first cycle.

2. An operation control method as claimed in claim 1, wherein the reactivity introduced by the operation of the control means is a reactivity introduced by the operation of said first and second control means.

3. An operation control method as claimed in claim 1 or 2, wherein the manipulated variable of the second control means is obtained during the operation period of said first cycle and its value is stored, and the operation of said second control means is performed based on the stored manipulated variable, to thereby control the reactor power during the second cycle.

4. An operation control method as claimed in claim 3, wherein said operation period of the second cycle is split into a plurality of control time units, and a manipulated variable of said second control means for each of said control time units is obtained and stored.

5. An operation control method as claimed in claim 3, wherein said first control means comprises control rods, and said second control means comprises liquid poison concentration adjusting means.

6. An operation control method for a nuclear reactor wherein the reactor power of the nuclear reactor having first control means for effecting coarse adjustments of reactor power and second control means for effecting fine adjustments of reactor power is controlled in accordance with a predetermined load variation schedule in which variations in load within a predetermined time period are cyclicaly repeated and which is distinct from a previously followed load variation schedule, comprising the steps of:
   obtaining a reactivity introduced by operating the control means in a first cycle of said load variation schedule;
   obtaining a manipulated variable of said second control means for a second cycle of the load variation schedule which follows the first cycle based on the reactivity introduced in the first cycle; and
   operating said second control means based on the manipulated variable obtained in the first cycle when a change in reactivity in the second cycle has become equal to a change in reactivity in the first cycle, to thereby effect control of the reactor power in the second cycle.

7. An operation control method as claimed in claim 6, wherein the reactor power is controlled in the second cycle, when the change in reactivity in the second cycle is distinct from the change in the first cycle, by following a step in which a reactivity which shows a change with time is set based on the load variation schedule program and data obtained for analyzing dynamic characteristics of a reactor core, a step in which a changing rate of the reactivity set in the preceding step is obtained and a step in which said second control means is operated in accordance with the changing rate obtained in the preceding step, said control of the reactor power being repeatedly performed until the change in the reactivity of the next following cycle becomes equal to the change in the reactivity of the preceding cycle, and said second control means is operated based on the manipulated variable obtained in the preceding cycle, to thereby control the reactor power during the second cycle.

8. An operation control method as claimed in claim 6, wherein the reactivity introduced by the operation of the control means is a reactivity introduced by the operation of said first and second control means.

9. An operation control method as claimed in claim 6 or 8, wherein the manipulated variable of the second control means is obtained during the operation period of said first cycle and its value is stored, and the operation of said second control means is performed based on the stored manipulated variable, to thereby control the reactor power during the second cycle.

10. An operation control method as claimed in claim 9, wherein said operation period of the second cycle is split into a plurality of control time units, and a manipulated variable of said second control means for each of said control time units is obtained and stored.

11. An operation control method as claimed in claim 9, wherein said first control means comprises control rods, and said second control means comprises liquid poison concentration adjusting means.

12. An operation control method as claimed in claim 7, wherein when said first control means is operated, the reactivity set in said step for setting a reactivity which changes with time is corrected based on the reactivity introduced by the operation of said first control means to provide a corrected reactivity, and a changing rate of the corrected reactivity is obtained.

13. An operation control method as claimed in claim 7 or 12, wherein first control means comprises control rods, and said second control means comprises liquid poison concentration adjusting means.

* * * * *